(12) United States Patent
Yokono

(10) Patent No.: US 10,140,509 B2
(45) Date of Patent: Nov. 27, 2018

(54) INFORMATION PROCESSING FOR DETECTION AND DISTANCE CALCULATION OF A SPECIFIC OBJECT IN CAPTURED IMAGES

(71) Applicant: SONY CORPORATION, Tokyo (JP)

(72) Inventor: Jun Yokono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 190 days.

(21) Appl. No.: 14/565,688

(22) Filed: Dec. 10, 2014

(65) Prior Publication Data

US 2015/0178934 A1 Jun. 25, 2015

(30) Foreign Application Priority Data

Dec. 19, 2013 (JP) ................................. 2013-262011

(51) Int. Cl.
| | | |
|---|---|---|
| *G06K 9/00* | (2006.01) | |
| *G01B 11/25* | (2006.01) | |
| *G06K 9/46* | (2006.01) | |
| *G06K 9/62* | (2006.01) | |

(52) U.S. Cl.
CPC .......... *G06K 9/00375* (2013.01); *G01B 11/25* (2013.01); *G06K 9/4614* (2013.01); *G06K 9/6257* (2013.01)

(58) Field of Classification Search
None
See application file for complete search history.

(56) References Cited

U.S. PATENT DOCUMENTS

| | | | | |
|---|---|---|---|---|
| 9,233,470 | B1* | 1/2016 | Bradski | .................... B25J 9/163 |
| 2004/0095315 | A1* | 5/2004 | Montellese | .......... G03H 1/0005 |
| | | | | 345/156 |
| 2008/0244468 | A1* | 10/2008 | Nishihara | ............... G06F 3/017 |
| | | | | 715/863 |
| 2008/0252596 | A1* | 10/2008 | Bell | ....................... G06F 3/0304 |
| | | | | 345/156 |
| 2010/0157254 | A1* | 6/2010 | Ishii | ....................... G03B 21/00 |
| | | | | 353/69 |
| 2010/0231522 | A1* | 9/2010 | Li | .......................... G06F 3/0423 |
| | | | | 345/169 |
| 2011/0033088 | A1* | 2/2011 | Rekimoto | ............. G06F 3/0425 |
| | | | | 382/107 |
| 2012/0268364 | A1* | 10/2012 | Minnen | .................... G06F 3/017 |
| | | | | 345/156 |
| 2013/0016070 | A1* | 1/2013 | Starner | ................ G02B 27/017 |
| | | | | 345/175 |
| 2014/0086490 | A1* | 3/2014 | Li | ............................ G06K 9/46 |
| | | | | 382/190 |

FOREIGN PATENT DOCUMENTS

JP 2004-132759 A 4/2004

\* cited by examiner

*Primary Examiner* — Matthew Bella
*Assistant Examiner* — Jose M Torres
(74) *Attorney, Agent, or Firm* — Chip Law Group

(57) ABSTRACT

An information processing device includes a data processing unit that executes analysis of images which are captured from different viewpoints. The data processing unit executes an object distance calculation process in which pattern-irradiated images of a plurality of different viewpoints are applied, and an object detection process in which non-pattern-irradiated images are applied.

15 Claims, 18 Drawing Sheets

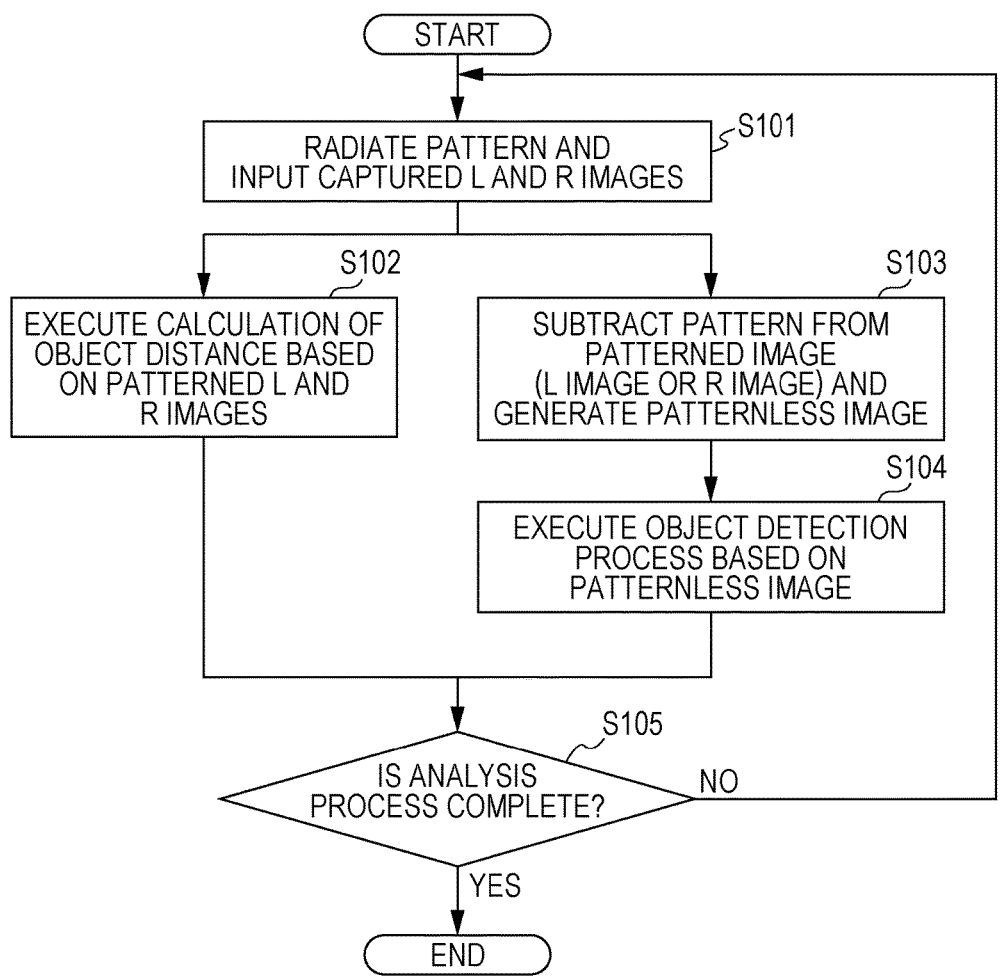

$G_{d,\theta} \otimes I(x_i, y_i, s_i)$ $|G_{d,\theta} \otimes I(x_i, y_i, s_i)|$ $\sum_{x,y} |G_{d,\theta} \otimes I(x_i, y_i, s_i)|$ $(x_i, y_i)$: POSITION,
$G_{d,\theta}$: RECTANGLE KERNEL ($d$-ORDER, $\theta$-ORIENTATION)

INFORMATION PROCESSING FOR DETECTION AND DISTANCE CALCULATION OF A SPECIFIC OBJECT IN CAPTURED IMAGES

CROSS REFERENCE TO RELATED APPLICATIONS

This application claims the benefit of Japanese Priority Patent Application JP 2013-262011 filed Dec. 19, 2013, the entire contents of which are incorporated herein by reference.

BACKGROUND

The present disclosure relates to an information processing device, an information processing method, and a program. More specifically, the present disclosure relates to an information processing device, an information processing method, and a program, each of which performs detection and distance calculation of a specific object based on images captured by cameras.

A distance analysis process using a stereo camera is generally used as a system which calculates the distance to a subject that is captured in an image.

The system analyses corresponding points in two images which are captured from two different positions, and calculates the distance (the depth) from the camera to the subject based on the corresponding point information.

Japanese Unexamined Patent Application Publication No. 2004-132759 is an example of the related art which discloses performing distance measurement using a stereo camera. For example, feature points such as an edge region in which the change amount of pixel values in the image is great are used for the corresponding points in the two images. However, for example, in a flat region such as a colorless wall, it is difficult to set feature points such as edges, and it is difficult to accurately perform the distance calculation.

In order to solve these problems, a process is performed in which a region that serves as the measurement target such as a wall is irradiated with a predetermined pattern, an image that is irradiated with the pattern is captured, feature points are set using the captured image containing the pattern, and the corresponding points are detected.

The detection of the corresponding points based on the feature points is facilitated by the pattern irradiation, and it is possible to calculate the subject distance with high precision. However, when detecting a specific subject from the captured image such as when attempting to detect a finger of a person contained in the captured image, there is a case in which the pattern is an impediment. For example, when detecting a finger of a person from the captured image, in order to detect the features of the finger of the person, a process is performed in which filters having various patterns are applied.

Specifically, for example, a process in which an image pattern that arises in a boundary region between the finger and the background region is detected from the captured image using a filter application process is executed.

When performing the subject detection process in which the filters are applied, the patterns which are radiated from outside (described above) conversely impede the accurate object detection using the filters.

SUMMARY

It is desirable to provide an information processing device, an information processing method, and a program, each of which enables the high precision execution of detection and distance calculation of a specific object based on images captured by a camera.

According to a first embodiment of the present disclosure, there is provided an information processing device that includes a data processing unit that executes analysis of images which are captured from different viewpoints. The data processing unit executes an object distance calculation process in which pattern-irradiated images of a plurality of different viewpoints are applied, and an object detection process in which non-pattern-irradiated images are applied.

In the embodiment of the information processing device of the present disclosure, the data processing unit may generate the non-pattern-irradiated image by performing an image conversion which subtracts a pattern image from the pattern-irradiated image, and may execute an object detection process in which the generated non-pattern-irradiated image is applied.

In the embodiment of the information processing device of the present disclosure, the data processing unit may include (a) an object distance calculation process in which pattern-irradiated images of a plurality of different viewpoints are input and the pattern-irradiated images of a plurality of different viewpoints that are input are applied, and (b) an object detection process in which a non-pattern-irradiated image is input and the non-pattern-irradiated image that is input is applied, and the data processing unit may execute the (a) and the (b) processes alternately.

In the embodiment of the information processing device of the present disclosure, in the object detection process, the data processing unit may be configured to execute a feature value extraction process which extracts feature values from the non-pattern-irradiated image, and a specific object recognition process which executes a position determination process of a specific object based on the feature values. The feature value extraction process may be executed as a feature value extraction process in which a plurality of filters are applied.

In the embodiment of the information processing device of the present disclosure, the data processing unit may execute feature value extraction by selectively applying filters that are determined to have a high identification performance for distinguishing between a detected state and a non-detected state of the specific object in a learning process that is executed in advance.

In the embodiment of the information processing device of the present disclosure, the data processing unit may calculate a score obtained by adding together feature values corresponding to different filters that are extracted in the feature value extraction process, and may execute detection and determination processes of the specific object based on the sum score.

In the embodiment of the information processing device of the present disclosure, the data processing unit may calculate scores corresponding to pixels obtained by adding together feature values corresponding to pixels that correspond to different filters that are extracted in the feature value extraction process, and may execute processes for detecting and determining the specific object based on a total score that is obtained by further adding together the calculated scores that correspond to the pixels. In the embodiment of the information processing device of the present disclosure, the pattern-irradiated image may be an infrared light pattern-irradiated image.

According to a second embodiment of the present disclosure, there is provided an information processing device that includes a data processing unit that executes analysis of images which are captured from different viewpoints. The data processing unit executes an object distance calculation process in which pattern-irradiated images of a plurality of different viewpoints are applied, and an object detection process in which an image for specific object detection that is generated by subtracting a background model image which does not contain a detection target from the pattern-irradiated image is applied.

In the embodiment of the information processing device of the present disclosure, the data processing unit may continuously capture a plurality of frames of images that do not contain the detection target, and may generate the background model image by averaging the plurality of captured images.

In the embodiment of the information processing device of the present disclosure, in the object detection process, the data processing unit may be configured to execute a feature value extraction process which extracts feature values from the image for specific object detection, and a specific object recognition process which executes a position determination process of a specific object based on the feature values. The feature value extraction process may be executed as a feature value extraction process in which a plurality of filters are applied.

In the embodiment of the information processing device of the present disclosure, the data processing unit may execute feature value extraction by selectively applying filters that are determined to have a high identification performance for distinguishing between a detected state and a non-detected state of the specific object in a learning process that is executed in advance.

In the embodiment of the information processing device of the present disclosure, the data processing unit may calculate a score obtained by adding together feature values corresponding to different filters that are extracted in the feature value extraction process, and may execute detection and determination processes of the specific object based on the sum score.

In the embodiment of the information processing device of the present disclosure, the data processing unit may calculate scores corresponding to pixels obtained by adding together feature values corresponding to pixels that correspond to different filters that are extracted in the feature value extraction process, and may execute processes for detecting and determining the specific object based on a total score that is obtained by further adding together the calculated scores that correspond to the pixels. In the embodiment of the information processing device of the present disclosure, the pattern-irradiated image may be an infrared light pattern-irradiated image.

According to a third embodiment of the present disclosure, there is provided an information processing method executed by an information processing device. The method includes causing a data processing unit to execute an object distance calculation process in which pattern-irradiated images of a plurality of different viewpoints are applied, and an object detection process in which non-pattern-irradiated images are applied.

According to a fourth embodiment of the present disclosure, there is provided an information processing method executed by an information processing device. The method includes causing a data processing unit to execute an object distance calculation process in which pattern-irradiated images of a plurality of different viewpoints are applied, and an object detection process in which an image for specific object detection that is generated by subtracting a background model image which does not contain a detection target from the pattern-irradiated image is applied.

According to a fifth embodiment of the present disclosure, there is provided a program for causing an information processing device to execute information processing. The program includes causing a data processing unit to execute an object distance calculation process in which pattern-irradiated images of a plurality of different viewpoints are applied, and an object detection process in which non-pattern-irradiated images are applied.

According to a sixth embodiment of the present disclosure, there is provided a program for causing an information processing device to execute information processing. The program includes causing a data processing unit to execute an object distance calculation process in which pattern-irradiated images of a plurality of different viewpoints are applied, and an object detection process in which an image for specific object detection that is generated by subtracting a background model image which does not contain a detection target from the pattern-irradiated image is applied.

Note that, the program according to the embodiment of the present disclosure is, for example, a program which can be provided using a storage medium or a communications medium which is provided in a computer-readable format in an information processing device or a computer system which is capable of executing a variety of program code. Processing which corresponds to a program on an information processing device or a computer system is realized by providing the program in a computer-readable format.

Other aims, characteristics and merits of the present disclosure will become clear due to a detailed description based on the examples and attached drawings of the present disclosure described later. Note that, the system in the present specification is a logical collection of configurations of a plurality of devices, and the devices of the configurations are not limited to being within the same housing.

According to the configuration of an example of the present disclosure, a device and a method, which execute two processes of the detection process and the distance calculation process of the specific object, are realized at high precision.

Specifically, an object distance calculation process in which pattern-irradiated images that are captured from different viewpoints are applied, and an object detection process in which a non-pattern-irradiated image is applied are executed. The data processing unit generates the non-pattern-irradiated image by performing an image conversion which subtracts a pattern image from the pattern-irradiated image, and executes an object detection process in which the generated non-pattern-irradiated image is applied. Alternatively, the object distance calculation process in which the pattern-irradiated images are applied, and the object detection process in which the non-pattern-irradiated image is applied are executed alternately.

According to this configuration, a device and a method, each of which executes two processes of the detection process and the distance calculation process of the specific object, are realized at high precision. Note that, the effects disclosed in the present specification are merely examples, embodiments are not to be limited thereto and additional effects may be present.

BRIEF DESCRIPTION OF THE DRAWINGS

FIG. 2 is a diagram depicting a flowchart that illustrates an example of a sequence of processes which are executed by the information processing device according to an embodiment of the present disclosure;

DETAILED DESCRIPTION OF EMBODIMENTS

Hereinafter, an information processing device, an information processing method, and a program according to an embodiment of the present disclosure will be described in detail with reference to the drawings.

Note that, the description will be given according to the following items.
1. Outline of Processes Executed by Information Processing Device of Present Disclosure
2. First Example of Information Processing Device of Present Disclosure
2A. Object Distance Calculation Process
2B. Object Detection Process
2B-1. Processes Executed by Feature Value Extraction Unit of Learning Process Unit
2B-2. Processes Executed by Machine Learning Unit
2B-3. Processes Executed by Recognition Process Unit
3. Second Example of Information Processing Device of Present Disclosure
4. Third Example of Information Processing Device of Present Disclosure
5. Configuration Example of Information Processing Device
6. Summary of Configuration of Present Disclosure 1. Outline of Processes Executed by Information Processing Device of Present Disclosure First, description will be given of the outline of the processes which are executed by the information processing device according to an embodiment of the present disclosure with reference to FIGS. 1A and 1B onward.

The information processing device according to an embodiment of the present disclosure receives input of images captured by cameras that are installed in a plurality of different positions, and executes the following processes based on the analysis of the images captured by the cameras.

(a) is a "specific object distance calculation process" which calculates the distance of a specific object in the captured images.

(b) is a "specific object detection process" which determines whether or not a specific object is contained in the captured images.

The information processing device executes the processes (a) and (b). Note that, in the following example, description will be given of the example in which the specific object that serves as the target of the distance calculation and the detection process is a finger 30 of a person illustrated in FIG. 1A.

Figure 1A:
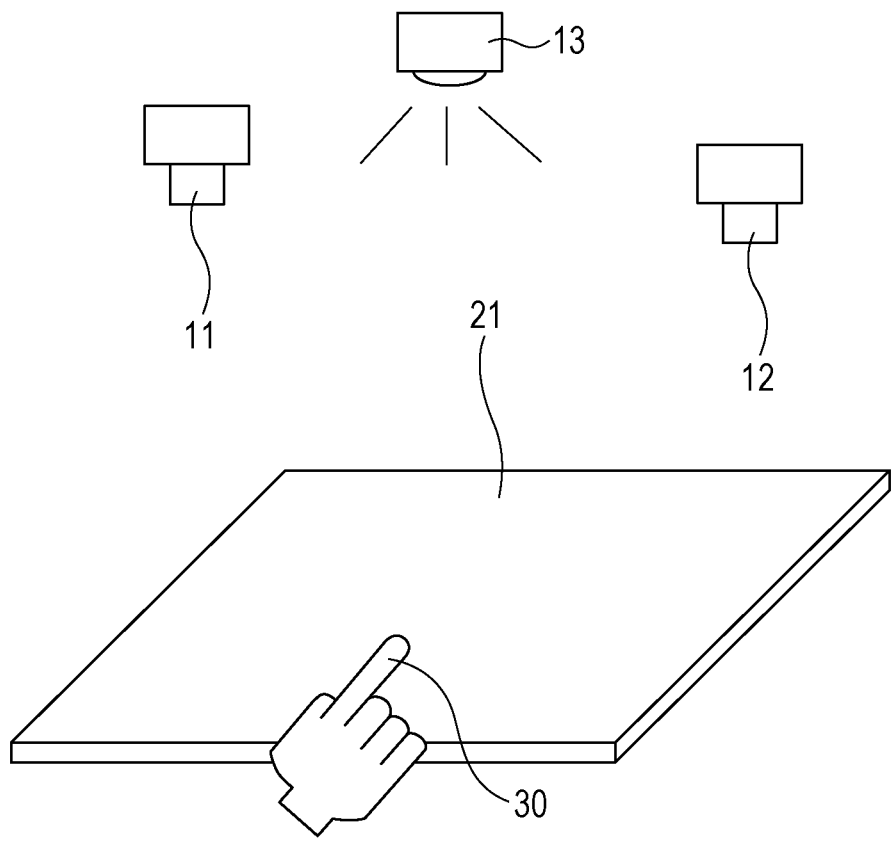
FIGS. 1A and 1B are diagrams illustrating the outline of a process which is executed by an information processing device according to an embodiment of the present disclosure.

FIG. 1A is a diagram illustrating an example of the capturing environment of the images. FIG. 1A illustrates a state in which the finger 30 of the person is present above a board 21, and the finger 30 is in contact with (is touching) the board 21.

Note that, the finger 30 is typically moving, and there is a case in which the finger 30 is in a distanced state of not being in contact with the board 21, and a case in which the finger 30 is distanced from the board 21 and no longer present above the board 21.

The information processing device according to an embodiment of the present disclosure determines the distance of the finger (the distance from a camera LR line) and whether or not a finger is present in the images captured by the cameras based on the captured images of the two cameras illustrated in FIG. 1A, that is, a camera L 11 and a camera R 12.

The camera L 11 is fixed in a position to the top left as seen from the center portion of the board 21, and captures the plane of the board 21 from the top left. Meanwhile, the camera R 12 is fixed in a position to the top right as seen from the center portion of the board 21, and captures the plane of the board 21 from the top right. When the finger 30 is present above the board 21, images containing the finger 30 are captured from the top left and the top right, respectively.

A pattern radiating unit 13 is provided in order to irradiate the board 21 and the finger 30 which are the subjects with a specific pattern, for example, a dot pattern or a Voronoi pattern. The pattern is used for detecting corresponding points in L and R images with high precision in the distance calculation using the stereo method.

Figure 1B:
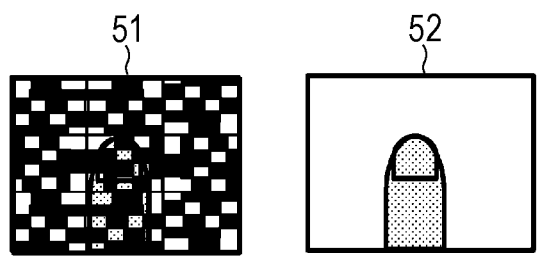

However, there is a case in which the irradiation pattern is an impediment in the object detection process which determines whether or not the specific object (the finger) is present in the image. FIG. 1B illustrates an example of the images captured by the camera.

A pattern-irradiated image 51 is an image which is captured by radiating a pattern from the pattern radiating unit 13.

A non-pattern-irradiated image 52 is an image which is captured without radiating a pattern from the pattern radiating unit 13.

The L and R images are substantially the same image. The pattern-irradiated image 51 enables high precision corresponding point detection in a corresponding point matching process using the L and R images.

However, in the object detection process which determines whether or not the specific object (the finger) is present in the image, it is possible to increase the detection precision by using the non-pattern-irradiated image 52. This is because, as illustrated in FIG. 1B, the pattern-irradiated image 51 includes a pattern which is not the actual object, and the pattern is an impediment to the object recognition.

For example, when attempting to detect a finger of a person contained in the captured image, in order to detect the features of the finger of the person, a process is performed in which filters having various patterns are applied. Specifically, for example, a process in which an image pattern that arises in a boundary region between the finger and the background image is detected from the captured image using a filter application process is executed.

When performing the subject detection process in which the filters are applied, the patterns which are radiated from outside (described above) impede the object detection using the filters. In regard to the processes according to an embodiment of the present disclosure, by adopting a configuration in which the pattern-irradiated image is used in the distance calculation of the object and the non-pattern-irradiated image is used in the detection process of the object, it is possible to execute both processes with high precision.

Note that, there is a case in which the non-pattern-irradiated image is generated from the pattern-irradiated image using predetermined image processing.

Hereinafter, a plurality of examples of the processes will be described in order.

Note that, the images captured by the camera L 11 and the camera R 12 may be still images or a moving image. When the captured images are still images, the distance calculation and the detection process of the object are executed using two captured still images. When the captured image is a moving image, for example, the distance calculation and the detection process of the object are executed in units of each captured frame, or, with a predetermined frame interval that is defined in advance.

2. First Example of Information Processing Device of Present Disclosure

Next, description will be given of the first example of the information processing device of the present disclosure.

First, description will be given of an example of the sequence of processes which are executed by the information processing device according to an embodiment of the present disclosure with reference to the flowchart illustrated in FIG. 2.

The information processing device according to an embodiment of the present disclosure receives input of the captured images of the camera L 11 and the camera R 12, which are the cameras installed in two different positions illustrated in FIG. 1A, for example. (a) is a "specific object distance calculation process" which calculates the distance of a specific object in the captured images. (b) is a "specific object detection process" which determines whether or not a specific object is contained in the captured images. Based on the input images, the information processing device executes the processes (a) and (b).

Description will be given of the processes of each step in the flow illustrated in FIG. 2.

Step S101

First, the information processing device causes the pattern radiating unit 13 to radiate a pattern, causes the cameras, the camera L 11 and the camera R 12, which are installed in two different positions to capture the pattern-irradiated image, and receives the input thereof.

Step S102

The process of step S102 can be executed in parallel with the processes of steps S103 and S104. The process of step S102 is the object distance calculation process that uses the pattern-irradiated L and R images which are captured in step S101.

Here, the distance of the finger 30 from the cameras is calculated. In the distance calculation, it is necessary to detect corresponding points in the L image and the R image. The patterns in the images are use effectively for executing the corresponding point detection at high precision.

Note that, in the present example, the object distance calculation uses the stereo method that uses corresponding point matching. A specific process example will be described later.

Step S103

The processes of steps S103 and S104 perform the detection of the specific object from within the captured image. For example, it is determined whether or not the finger 30 is contained in the image.

Note that, the object detection process may be executed on only one of the L image or the R image, and may be executed on each of the two images. Here, description will be given of an example in which the object detection is performed on only one of the L and R images.

The process of step S103 generates a patternless image from the patterned image. For example, an image conversion process which generates a non-pattern-irradiated L image from the pattern-irradiated L image.

The pattern which is radiated by the pattern radiating unit 13 is a known pattern, and it is possible to generate the patternless image by executing a subtraction of pixel values according to the known pattern from the image that is captured by the camera.

Step S104

Next, in step S104, using the patternless image that is generated in step S103, the detection process of the specific object in the captured image is executed. In other words, in the present example, the detection process of the object (the finger) in which it is determined whether or not a finger is contained in the captured image is executed.

In the finger detection process, learning data which indicate the feature values that are accumulated in advance are used. Description will be given later of the specific process of the finger detection process.

Step S105

Next, the information processing device determines whether or not the analysis process is complete in step S105. When no analysis target image is input, the information processing device determines the process to be complete. For example, when analysis is continuously executed at a frame interval that is defined in advance while capturing a moving image, the processes according to the flow illustrated in FIG. 2 are executed repeatedly at the predetermined frame interval. In this case, the decision of step S105 returns No, the process returns to step S101, and the analysis process of step S101 onward is repeatedly executed on new input images.

In this manner, the information processing device according to an embodiment of the present disclosure executes the object distance calculation process based on the two pattern-irradiated images that are captured from different viewpoints, and further executes the object detection process using the non-pattern-irradiated image that is generated from the pattern-irradiated image. Note that, in the example described here, the target object of the distance calculation and the detection process is the finger.

Note that, a configuration may be adopted in which the pattern radiated by the pattern radiating unit 13 is an irradiation pattern using infrared light, and the two cameras, camera L 11 and camera R 12, are cameras which are capable of capturing the pattern of infrared light. In this case, the corresponding point matching process of the L image and the R image which is executed in the calculation of the object distance in step S102 is executed using an infrared light pattern.

As described with reference to the flow illustrated in FIG. 2, in the distance calculation process, the information processing device according to an embodiment of the present disclosure executes a process in which the two pattern-irradiated images that are captured from different viewpoints are applied.

Meanwhile, in the object detection process, the information processing device executes a process which uses the non-pattern-irradiated image that is generated by subtracting the pattern image component from the pattern-irradiated image. By performing these processes, it is possible to execute both the object distance calculation process and the object detection process as high precision processes.

2A. Object Distance Calculation Process

Next, description will be given of the object distance calculation process which is executed in step S102 of the flow illustrated in FIG. 2.

The distance calculation is a process which uses an existing stereo method. The stereo method is a method in which two or more cameras are used, parallax is obtained by finding corresponding points between the images of the cameras, and the distance is measured.

The stereo method attempts to obtain the position of the measurement target object in three-dimensional space by associating pixels in a plurality of images that are obtained by capturing the same target object from two or more viewpoints (from different viewing directions) using a plurality of cameras. For example, the same target is captured from a plurality of different viewpoints using a base camera and a reference camera, and the distance of the measurement target object in the images is measured using the principle of triangulation.

Figure 3:
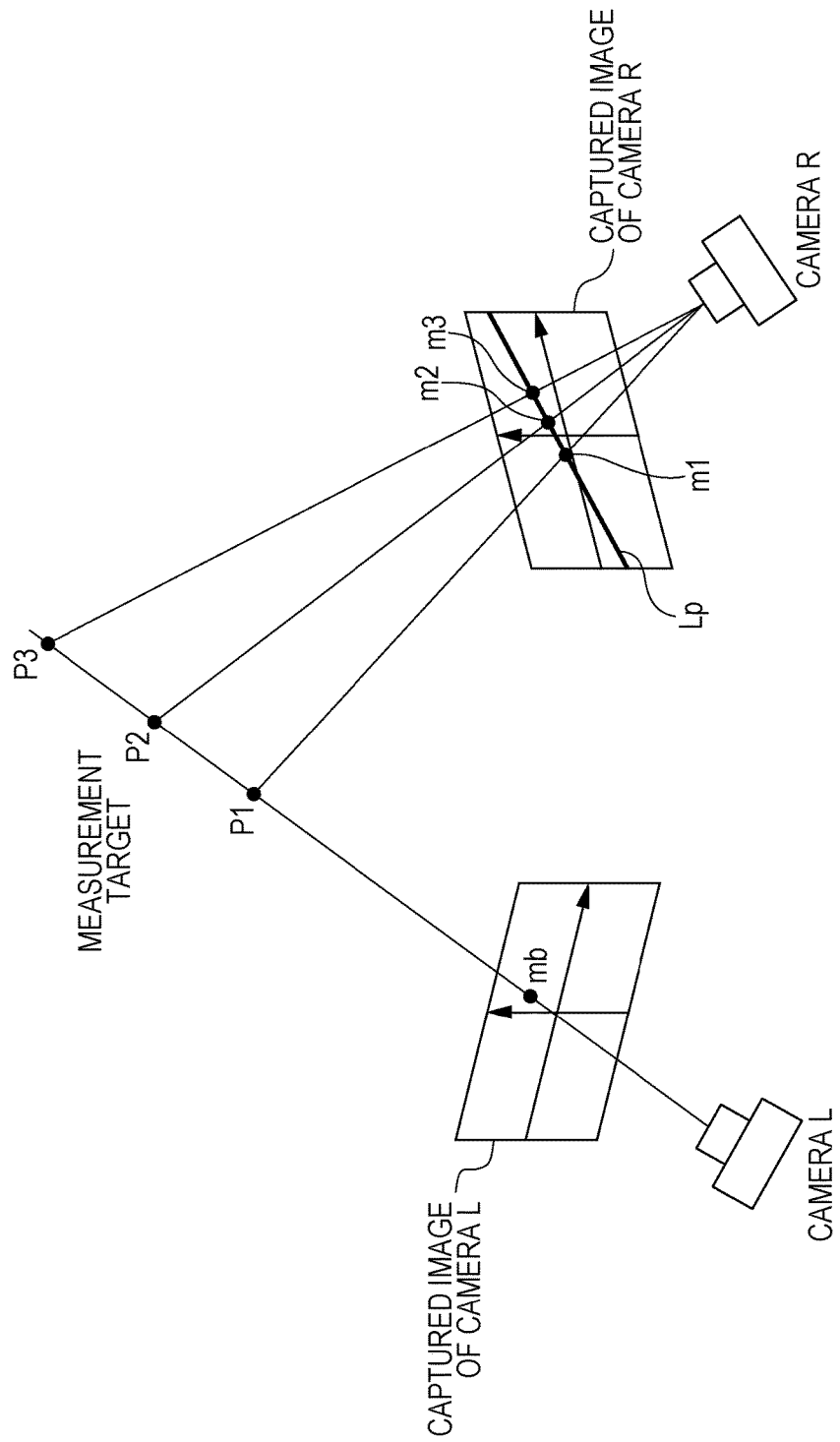
FIG. 3 is a diagram illustrating an example of a distance calculation process based on a stereo method.

FIG. 3 is a diagram explaining the principle of the stereo method. The base camera (Camera 1) and the reference camera (Camera 2) capture the same target object from different viewpoints. Here, obtaining the depth of a point referred to as "mb" in the image that is captured by the base camera will be considered.

The object which is visible at the point "mb" in the image captured by the base camera is spread out on a straight line as illustrated by "m1", "m2", and "m3" in the image that is captured by the reference camera which captured the same object from a different viewpoint. This straight line is referred to as the epipolar line Lp.

The position of the point "mb" in the base camera appears on the straight line referred to as the "epipolar line" in the image captured by the reference camera. As long as the imaging target points P (the points on the straight line including P1, P2, and P3) are present on the line of sight of the base camera, the points P appear at the observation point "mb" on the base image regardless of the depth, that is, the magnitude of the distance from the base camera. In contrast, the points P on the image captured by the reference camera appear in positions corresponding to the magnitude of the distance between the base camera and the observation points P on the epipolar line.

FIG. 3 illustrates the correspondence between the epipolar line and the observation point "mb" in the reference image. As illustrated in FIG. 3, the observation points in the reference image shift from "m1" to "m2" to "m3" as the position of the observation point P changes from P1 to P2 to P3.

Using the geometrical optical properties described above, by searching on the epipolar line for the observation point "mb", it is possible to identify the distance of the point P. This is the basic principle of the "stereo method". Using this method, it is possible to acquire three-dimensional information in relation to all of the pixels on the screen.

The stereo method described above is a configuration in which one base camera and one reference camera are used; however, a configuration may be adopted in which an evaluation value is obtained using a multi baseline stereo method that uses a plurality of reference cameras, and three-dimensional information is acquired for each pixel based on the evaluation value. Using the images that are captured by one base camera and a plurality of reference cameras, the multi baseline stereo image method obtains an evaluation value representing the relationship between each of a plurality of reference camera images and the base camera image, adds the evaluation values together, and sets the sum value as the final evaluation value.

As described above, the stereo image method attempts to obtain the position of the measurement target object in three-dimensional space by associating pixels in a plurality of images that are obtained by capturing the same target object from two or more viewpoints (from different viewing directions) using a plurality of cameras, that is, by carrying out "point correspondence (matching)". In the related art, "point correspondence" methods that are often used can be broadly classified as pixel-based matching, area-based matching, and feature-based matching.

Pixel-based matching is a method in which the correspondence to a point in one image is searched for as it is in another image. Area-based matching is a method in which, when searching for a correspondence to a point in one image in another image, searching is performed using the local image pattern surrounding the point.

Feature-based matching is a method in which features such as grayscale edges are extracted from the images, and the association is performed using only the features between the images.

The methods described above can be summarized as follows.

(1) Pixel-based matching and area-based matching search for corresponding points in each of the pixels; thus, a fine distance image is obtained. On the other hand, feature-based matching associates only the feature points; thus, a rough distance image is obtained.

(2) Since the area-based matching performs a type of correlation operation, the computational cost is greater than that of the pixel-based matching and the feature-based matching; however, it may be possible to solve this problem by speeding up the algorithm.

(3) Since the pixel-based matching only performs the association between pixels, the computational speed is notably fast; however, depending on differences in properties between the left and right cameras, it is not easy to perform association between the pixels using grayscale values.

From the characteristics described above, generally, the area-based matching is effective and often used as the method for obtaining the three-dimensional shape (or depth) of a target at high precision for each pixel.

The corresponding point association process in the stereo image method is performed using the various methods described above. However, in relation to a target with substantially no features (shading, shape, color or the like) such as a white wall or the face of a human, no matter which of the above-described methods is used, it is difficult to perform the corresponding point association process that is necessary for measuring the three-dimensional shape. This is one of the large problems in the process using the stereo image method.

In order to solve this problem, a pattern such as a dot pattern or a Voronoi pattern is radiated from the pattern radiating unit 13 to cause the captured image to contain the pattern, and the corresponding point search is executed using the image including the pattern.

By performing the corresponding point search process using the pattern image, high precision corresponding point matching becomes possible, and high precision distance calculation becomes possible.

2B. Object Detection Process

Next, description will be given of the object detection process which is executed in steps S103 and S104 of the flow illustrated in FIG. 2.

The processes of steps S103 and S104 perform the detection of the specific object from the captured image. For example, it is determined whether or not the finger 30 is contained in the image. Note that, the object detection process may be executed on only one of the L image or the R image, and may be executed on each of the two images. Here, description will be given of an example in which the object detection is performed on only one of the L and R images.

As described earlier, the process of step S103 generates a patternless image from the patterned image. For example, an image conversion process which generates a non-pattern-irradiated L image from the pattern-irradiated L image.

The pattern which is radiated by the pattern radiating unit 13 includes a known pattern, and the patternless image is generated by executing pixel value correction that accompanies pixel value subtraction according to the known pattern.

Next, in step S104, using the patternless image that is generated in step S103, the detection process of the specific object in the captured image is executed. In other words, in the present example, the detection process of the object (the finger) in which it is determined whether or not a finger is contained in the captured image is executed.

In the finger detection process, learning data which indicate the feature values that are accumulated in advance are used. Description will be given later of the specific process of the finger detection process.

Figure 4:
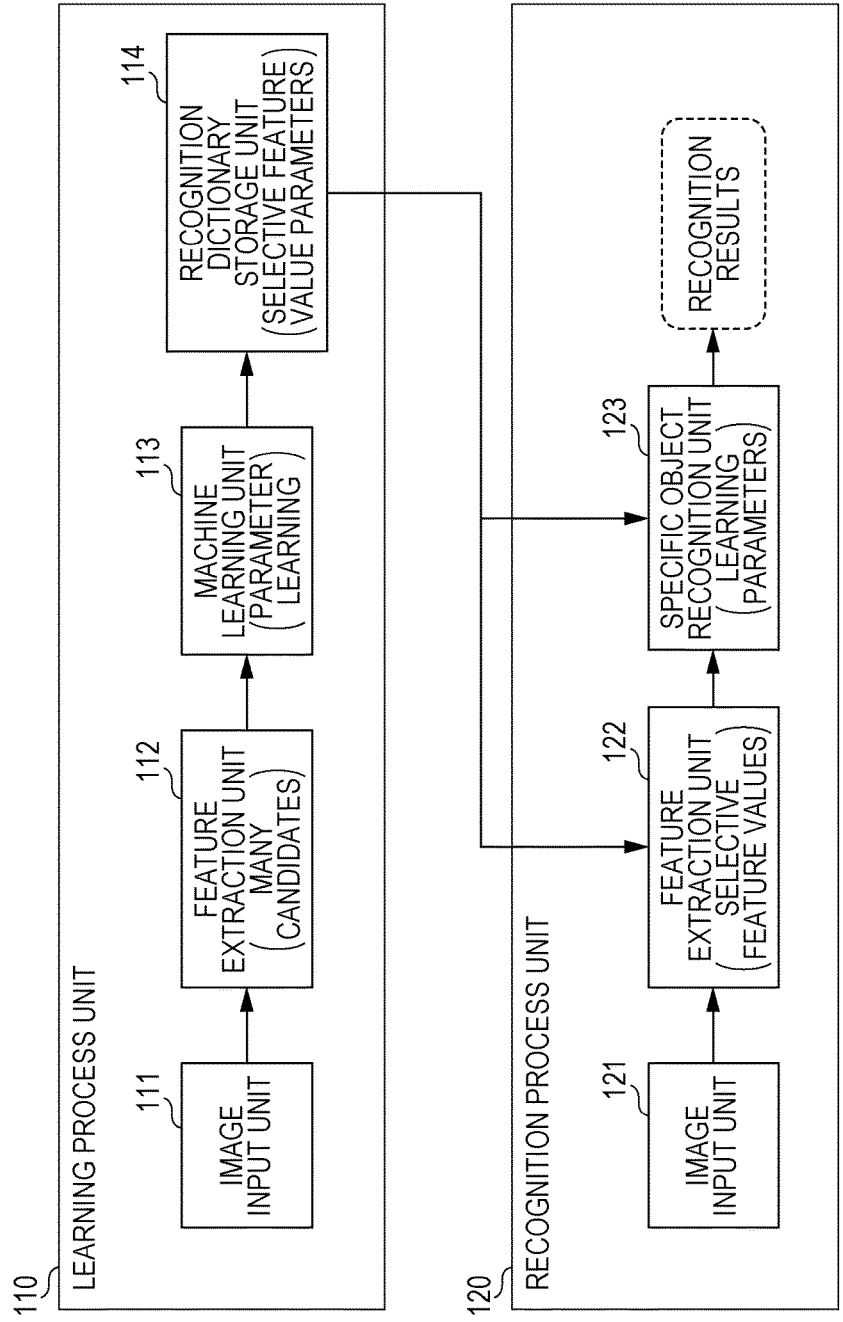
FIG. 4 is a diagram illustrating the configuration and processes of the information processing device according to an embodiment of the present disclosure.

FIG. 4 is a diagram illustrating a configuration example of an object detection process unit of the information processing device 100. The object detection process unit of the information processing device 100 includes a learning process unit 110 and a recognition process unit 120.

The learning process unit 110 includes an image input unit 111, a feature value extraction unit 112, a machine learning unit 113, and a recognition dictionary storage unit 114.

The learning process unit 110 receives the input of multiple images as learning images, and, based on the learning images, generates a recognition dictionary that the recognition process unit 120 uses for detecting the specific object from the images. The generated recognition dictionary is stored in the recognition dictionary storage unit 114.

Meanwhile, the recognition process unit 120 includes an image input unit 121, a feature value extraction unit 122, and a specific object recognition unit 123.

The recognition process unit 120 receives input of analysis target images and performs the detection and the position determination of the specific object. The recognition process unit 120 performs the detection and the position determination of the specific object using the recognition dictionary that is generated by the learning process unit 110 based on the learning data and stored in the recognition dictionary storage unit 114.

The process of step S104 of the flowchart illustrated with reference to FIG. 2 corresponds to the process that is executed by the recognition process unit 120.

The learning process unit 110 generates the recognition dictionary as the learning data which are applied to the object detection process that determines whether or not the finger is contained in the image.

Note that, as the images which are applied to the learning process, it is possible to apply a patternless image that is not irradiated with a pattern from the start. Alternatively, a configuration may be adopted in which a similar process to that of step S103 of the flow illustrated in FIG. 2 is executed, and is executed using the patternless image that is generated from the pattern-irradiated image.

Hereinafter, the processes that are executed by each process unit illustrated in FIG. 4 will be described in order.

2B-1. Processes Executed by Feature Value Extraction Unit of Learning Process Unit First, description will be given of the processes that are executed by the feature value extraction unit 112 in the learning process unit 110 of the information processing device 100 illustrated in FIG. 4.

The learning process unit 110 receives input of multiple captured images from the image input unit 111 as learning images. The learning images are, for example, the multiple images that are captured in the capturing environment described with reference to FIG. 1A.

The learning images include multiple images of each of the following states:

(state 1) A state in which the finger 30 is included in the captured image.

(state 2) A state in which the finger 30 is not included in the captured image.

Note that, attribute information (labels, tags, and the like) indicating which of the above-described state image each image corresponds to is set for each of the learning image to be input when performing the learning process.

Note that, as described above, the images to be applied to the learning process are the patternless images that are not irradiated with a pattern from the start. Alternatively, a similar process to that of step S103 of the flow illustrated in FIG. 2 is executed, and the patternless image that is generated from the pattern-irradiated image is used.

When the image input unit 111 inputs the pattern-irradiated image from the camera, the feature value extraction unit 112 first removes the irradiation pattern contained in the camera captured image and generates a patternless image. This process corresponds to the process of step S103 of the flow illustrated in FIG. 2. The non-pattern-irradiated image is generated by executing pixel value correction in which pixel values corresponding to the known irradiation pattern are subtracted.

Figure 5:
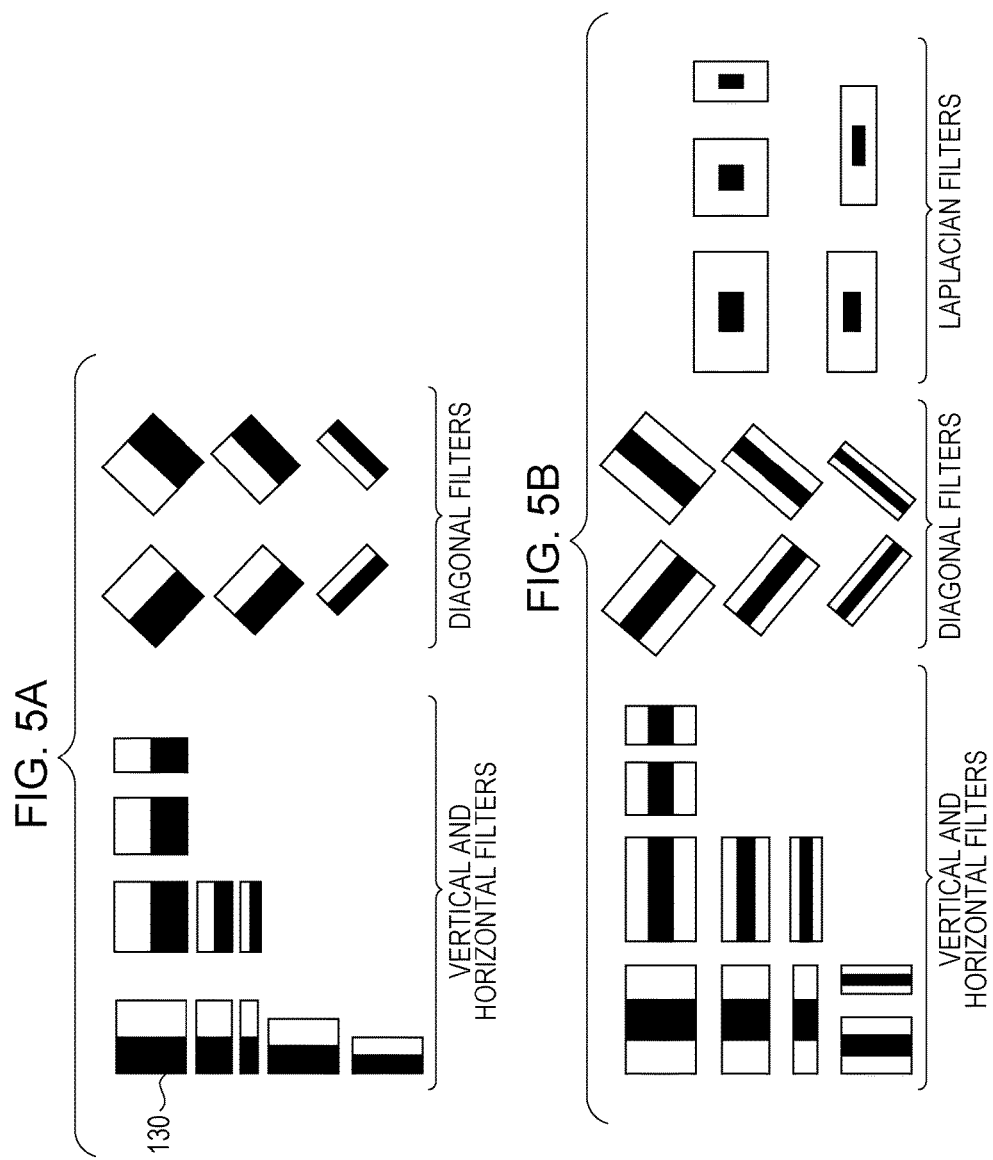
FIGS. 5A and 5B are diagrams illustrating filters which are applied to feature value extraction.
Figure 6:
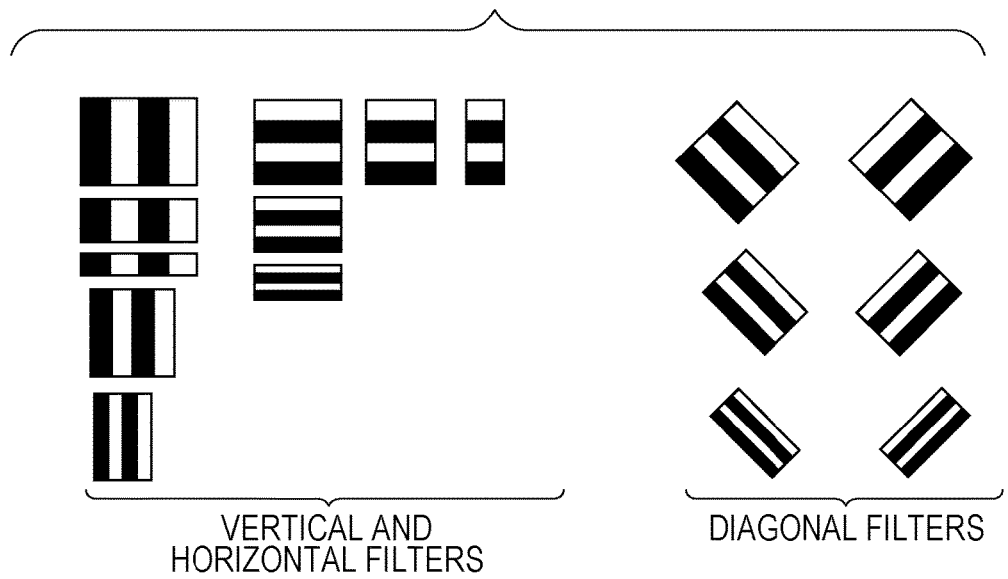
FIG. 6 is a diagram illustrating filters which are applied to feature value extraction.

The feature value extraction unit 112 sets the patternless image as the learning image and extracts the feature values contained in the learning image. Various filters are used in the feature value extraction. Examples of rectangular filters that are applied to the feature value extraction are illustrated in FIGS. 5A, 5B, and 6.

The primary differential filters illustrated in FIG. 5A are suitable for a process which extracts pixel regions with a feature changing from white to black or from black to white within the image from the input image.

It is possible to efficiently extract the pixel regions using the vertical and horizontal direction filters when the direction in which white changes to black or black changes to white is vertical or horizontal, and it is possible to efficiently extract the pixel regions using the diagonal direction filters when the direction in which white changes to black or black changes to white is a diagonal direction.

The secondary differential filters illustrated in FIG. 5B are suitable for a process which extracts pixel regions with a feature changing from white to black to white or from black to white to black within the image from the input image.

It is possible to efficiently extract pixel regions using the vertical and horizontal direction filters when the direction of change is a vertical or horizontal direction, and it is possible to efficiently extract pixel regions using the diagonal filters when the direction of change is a diagonal direction. The tertiary differential filters illustrated in FIG. 6 are suitable for a process which extracts pixel regions with a feature changing from white to black to white to black or from black to white to black to white within the image from the input image.

It is possible to efficiently extract pixel regions using the vertical and horizontal direction filters when the direction of change is a vertical or horizontal direction, and it is possible to efficiently extract pixel regions using the diagonal filters when the direction of change is a diagonal direction.

Description will be given of an example of the feature value extraction that applies the filters and is executed by the feature value extraction unit 112 in the learning process unit 110 of the information processing device 100 illustrated in FIG. 4 with reference to FIGS. 7A to 7D.

FIGS. 7A to 7D illustrate an example of a process that applies a filter 130, which changes from black to white in the horizontal direction and is illustrated in the upper left corner of the primary differential filters illustrated in FIG. 5A, and extracts pixel regions with similar changing regions from the image.

Figures 7A, 7B:
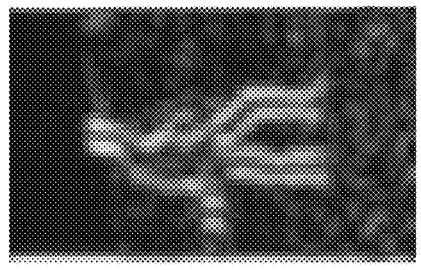
FIGS. 7A, 7B, 7C and 7D are diagrams illustrating a feature value extraction process.

FIG. 7A is an input image. Here, the input image is a learning image, and is a patternless image.

FIG. 7B is an image which is obtained by executing a filtering operation in which the filter 130, which changes from black to white in the horizontal direction and is illustrated in the upper left corner of the primary differential filters illustrated in FIG. 5A, is applied.

As illustrated in FIGS. 7A to 7D, the filtering operation is executed according to the following expression.

$$G_{d,\theta} \otimes I(x_i, y_i, s_i) \qquad (1)$$

$G_{d,\theta}$ shown in expression 1 above represents the d-th differential function of the Gaussian function G corresponding to each filter that is described with reference to FIGS. 5A, 5B, and 6. The term d corresponds to the orders described with reference to FIGS. 5A, 5B, and 6, and θ corresponds to the angle of the filter, that is, the set angle of the filter such as vertical and horizontal (0°, 90°) and diagonal (45°,135°) described with reference to FIGS. 5A, 5B, and 6.

The terms $(x_i, y_i)$ of $I(x_i, y_i, s_i)$ indicate the pixel position, and the term $s_i$ means the scale of the image. The term i is a scale identifier of the image to be applied.

The expression $I(x_i, y_i, s_i)$ indicates the pixel value, for example, the brightness of the pixel position $(x_i, y_i)$ of an image of a scale $s_i$. Expression 1 is an expression that executes a convolution operation on the filter that is defined by $G_{d,\theta}$ and each pixel value of the image.

The example illustrated in FIGS. 7A to 7D is an execution example of the filtering operation in which the filter 130, which changes from black to white in the horizontal direction and is illustrated in the upper left corner of the primary differential filters illustrated in FIG. 5A, is applied. The pixel values of the input image of FIG. 7A are converted into the image illustrated in FIG. 7B using the filtering operation.

Figure 7C:
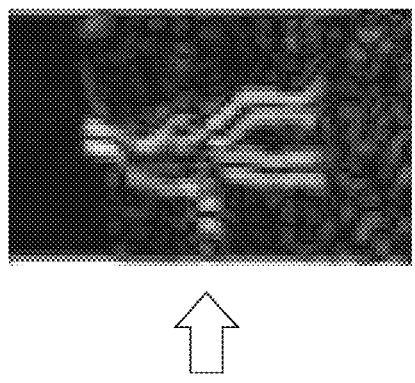

FIG. 7C is an image which is obtained by executing an operation which equalizes a pattern, which changes from black to white in the right direction and corresponds to the filter 130 illustrated in FIG. 5A, and a pattern that conversely changes from white to black. According to this process, the extraction of a constant feature pattern in relation to the background brightness, for example, is realized.

The filtering operation that is applied to the generation of the image is the operation represented by the following expression.

$$|G_{d,\theta} \otimes I(x_i, y_i, s_i)| \qquad (2)$$

Expression 2 corresponds to a process that calculates the absolute value of expression 1 described above.

Figure 7D:
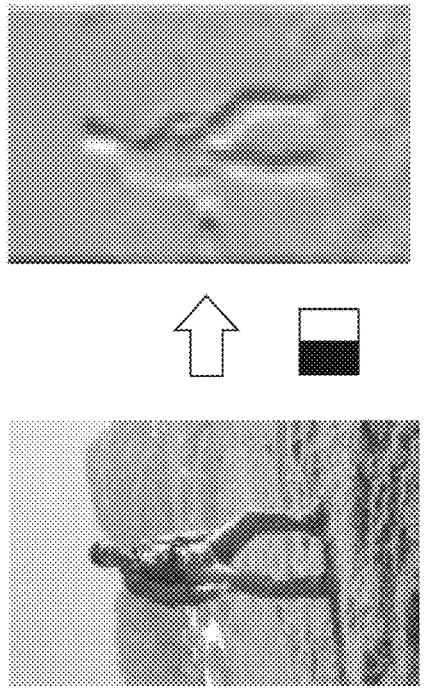

The image in FIG. 7D is obtained by subjecting the result obtained using expression 2 to a smoothing process in a pixel region of a predetermined range illustrated in FIG. 7C in order to increase the resilience to pixel position shifting and the like.

The filtering operation that is applied to the generation of the image is the operation represented by the following expression.

$$\sum_{x,y} |G_{d,\theta} \otimes I(x_i, y_i, s_i)| \qquad (3)$$

For example, the value obtained using Expression 3 is the feature value (x) that is obtained on the basis of the filter that is defined by $G_{d,\theta}$.

The example illustrated in FIGS. 7A to 7D is an example of the feature value calculation process in which the filter 130, which changes from black to white in the horizontal direction and is illustrated in the upper left corner of the primary differential filters illustrated in FIG. 5A, is applied. The more similar the pixel region is to the pattern of the filter 130, the greater the value of the feature value (x) becomes. Note that, the feature value (x) is calculated as a value corresponding to each of the pixels.

In relation to the other filters, a similar process is executed, the feature values (x) corresponding to each of the filters are extracted, and the extracted results are output to the machine learning unit 113 illustrated in FIG. 4.

2B-2. Processes Executed by Machine Learning Unit

Next, description will be given of the processes executed by the machine learning unit 113 in the learning process unit 110 illustrated in FIG. 4.

The filters illustrated in FIGS. 5A, 5B, and 6 can each be a single weak learner (WL). The weak learner determines whether or not an object is detected based on rectangular features obtained by superposing the filters on a search region, for example, based on whether or not the difference (the feature value x) between the sum of the brightness values in a region corresponding to the black rectangle and the sum of the brightness values in a region corresponding to the white rectangle is greater than a threshold (th).

In other words, in the object (the finger) detection process, it is determined whether or not the specific object is detected based on whether or not the feature value (x) that is obtained by applying the filters is greater than the threshold.

In the application of the rectangular filters of white and black patterns illustrated in FIGS. 5A, 5B, and 6, it is possible to determine a finger region with a degree of probability from the input image based on the rectangular features, for example, using the learning result that the region of the finger has a lower brightness value than the background.

While it is difficult to exhibit sufficient identification performance with only the individual weak learners, it is possible to construct a learner with a stronger identification performance by subjecting the identification results of a plurality of weak learners to linear combination.

One of the processes executed by the machine learning unit 113 is to combine the feature value extraction results obtained by the weak learners corresponding to each of the filters to generate a stronger learner, and to generate selective information (score) of the feature values that are optimal for the detection and position determination of the specific object (the finger) in the recognition process unit 120.

The process will be described with reference to FIG. 8. Note that, in FIG. 8 onward, description will be given of an example of the process of a case in which the object detection process which determines whether or not the finger is contained in the image is performed.

Figure 8:
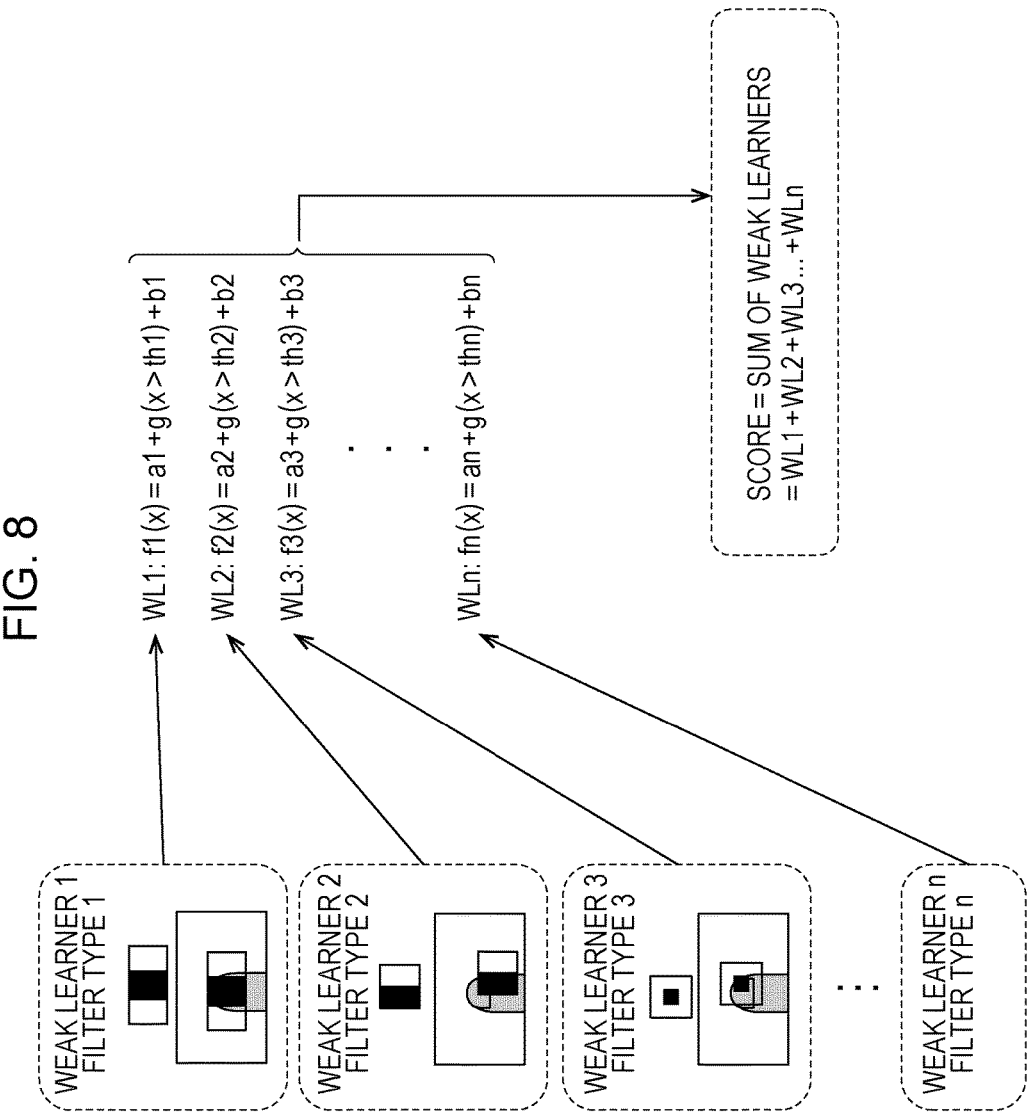
FIG. 8 is a diagram illustrating a score calculation process.

FIG. 8 is a diagram illustrating an example of a process in which the filters are set as the weak learners 1 to n, functions $f1(x)$ to $fn(x)$, which output determination results indicating whether or not the detection target (the finger) is contained in each image region based on the feature value (x) obtained by the weak learners 1 to n corresponding to each filter, are set, and the score is calculated based on the determination results that are obtained by the plurality of weak learners.

The function $fn1(x)$ which outputs the determination results indicating whether or not the detection target (for example, the finger) is contained in each of the image regions based on the feature values (x) obtained by the weak learners 1 to n corresponding to each of the filters is represented by the following equation (equation 4).

$$fn(x) = an \times g(x > thn) + bn \quad (4)$$

Note that, in expression 1, the terms an and bn are coefficients (parameters). The expression g (x>thn) is a function which, when the feature value x is greater than the threshold thn, outputs the numerical value "1" indicating that the predetermined region resembles the detection target, and when the feature value x is less than or equal to the threshold thn, outputs the numerical value "0" indicating that the predetermined region does not resemble the detection target.

The term n is the filter identifier. When the value calculated by equation 4 is $fn(x)=an+bn$, the predetermined region resembles the detection target, and when the value is $fn(x)=bn$, the predetermined region is determined not to resemble the detection target.

The sum value of the determination results fn(x) of the weak learners is set to the score F(x). The score F(x) is represented by the following equation (equation 5) for example.

$$F(x) = \Sigma fn(x) \quad (5)$$

In other words, the score F(x) is the sum of the determination results $f1(x)$ to $fn(x)$ of N weak learners. When the value of the score F(x) is greater than the predetermined threshold th, the detection target is assumed to be present in the image, and when the output value of the score F(x) is lower than or equal to the threshold th, the detection target is assumed not to be present in the image.

The machine learning unit 113 receives input of images that are classified into two types of category, images containing the finger and images not containing the finger, as multiple learning image data, outputs the determination results in which the filters 1 to n that are described with reference to FIGS. 5A, 5B, and 6 are applied, executes statistical learning based on the output results, and executes a process which selects the weak learner with high identification performance.

The process will be described with reference to FIGS. 9A and 9B.

Figure 9A:
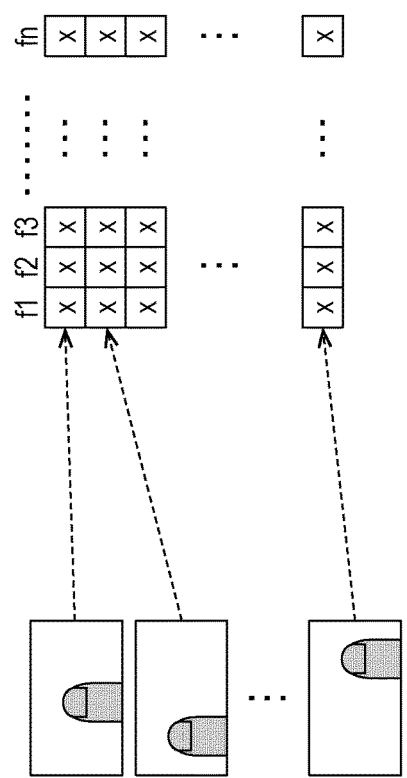
FIGS. 9A and 9B are diagrams illustrating a learning process for object detection.
Figure 9B:
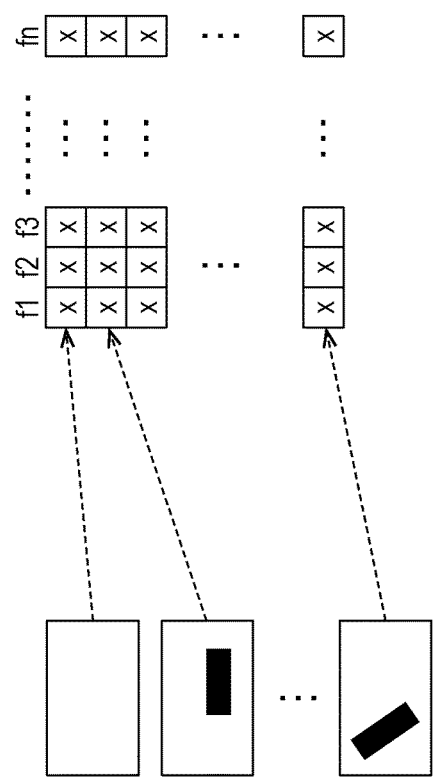

As examples of the learning images, FIG. 9A illustrates "finger-present images" in which the captured images contain a finger which is the identification target object, and FIG. 9B illustrates "finger-absent images" in which the captured images do not contain a finger which is the identification target object. The learning images are images for which attribute information (labels, tags, and the like) indicating which of FIGS. 9A and 9B the image corresponds to is set.

The feature values (x) obtained by applying the filters f1 to fn (=weak learners 1 to n) described with reference to FIGS. 5A, 5B, and 6 are calculated in relation to each of the images. Each x in a single rectangle illustrated in FIGS. 9A and 9B indicates the feature value x corresponding to a pixel of a single image to which a single filter is applied. Note that, in the object detection process, the primary to the tertiary differential filters illustrated in FIGS. 5A, 5B, and 6 are used.

The values of the feature values x which are calculated by the filter application process are different values according to the identification performance of the filters f1 to fn (=weak learners 1 to n); however, the greater the identification performance, the greater the difference between the finger-present image and the finger-absent image becomes.

Figure 10:
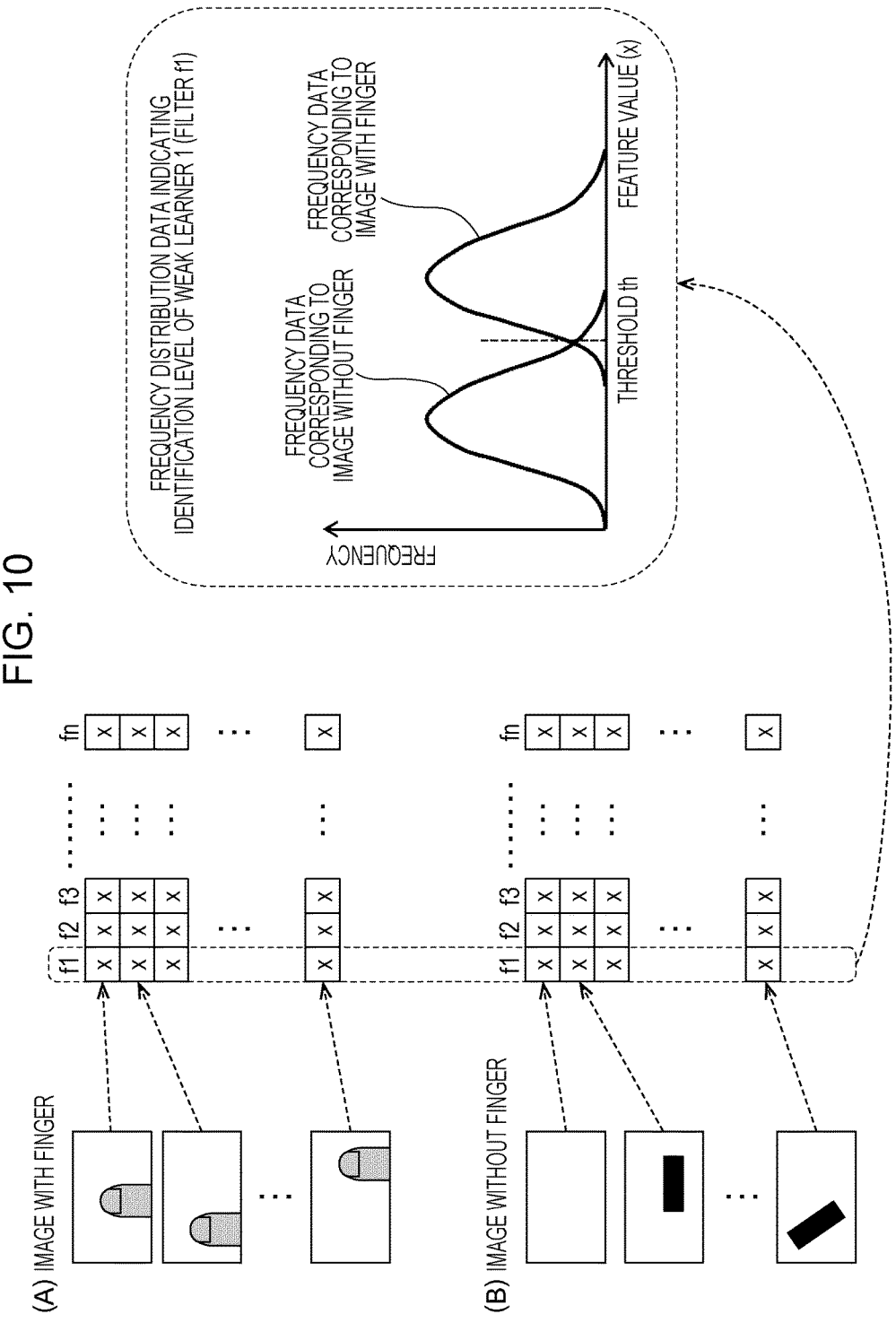
FIG. 10 is a diagram illustrating a learning process for object detection.

FIG. 10 illustrates the corresponding data between the feature values (x) and the frequency of a case in which the filter f1 is applied to each of the learning images. As shown by the frequency distribution data, when there is a degree of identification performance, the frequency distribution of the finger-present image data and the frequency distribution of the finger-absent image data form different curves. However, the distribution differs depending on the filter which is applied.

Figure 11A:
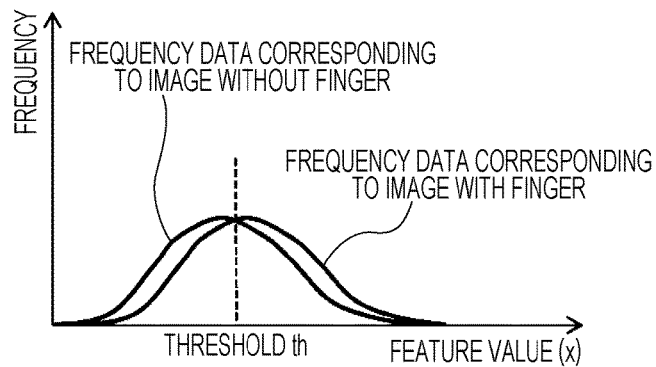
FIGS. 11A, 11B and 11C are diagrams illustrating a learning process for object detection.

FIG. 11A illustrates an example of frequency distribution data based on a weak learner (filter) with low identification performance.

Figure 11B:
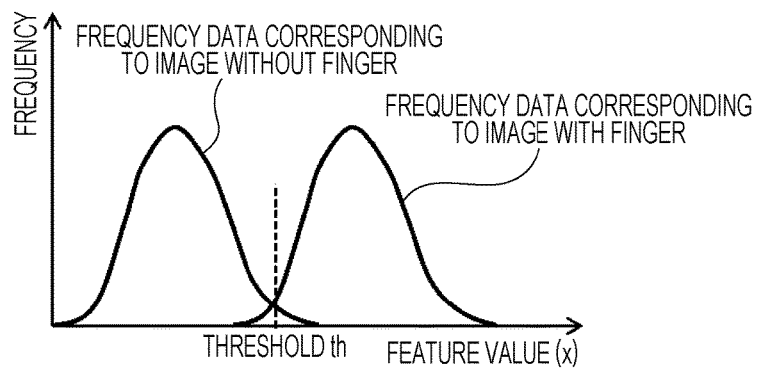

FIG. 11B illustrates an example of frequency distribution data based on a weak learner (filter) with high identification performance.

In this manner, when the weak learner (filter) with low identification performance is applied, it is difficult to distinguish the finger-present image from the finger-absent image, and when the weak learner (filter) with high identification performance is applied, it is easy to distinguish the finger-present image from the finger-absent image.

By performing a process in which only the weak learner (filter) with high identification performance is selected based on the frequency distribution data and the score, which is described with reference to FIG. 8, is calculated from only the selected filter, an identification process with higher reliability is realized.

Figure 11C:
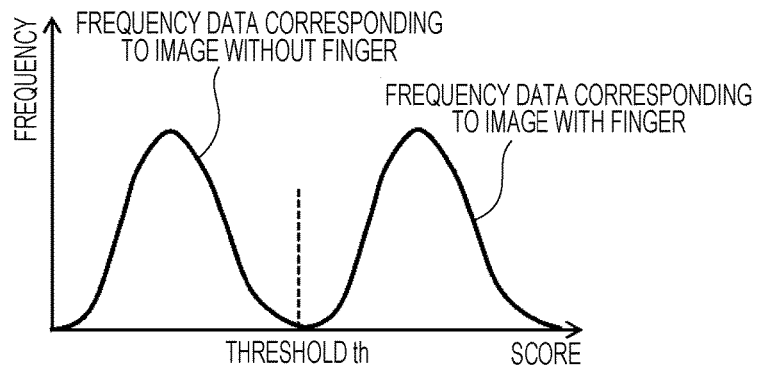

FIG. 11C illustrates an example of frequency distribution data of a score that is calculated from only a plurality of weak learners (filters) that are selected and have high identification performance.

The threshold of the score is, for example, determined by learning that uses a statistical learner such as boosting or a support vector machine (SVM).

The machine learning unit 113 executes the statistical learning and executes the selection of a filter with high identification performance.

The optimal value for setting the identification level to a high level is calculated using the statistical learning for the function $fn1(x)$ that outputs the determination result using the filters (the weak learners) described earlier with reference to FIG. 8, that is, for the parameters an, bn, and thn that are used in the following equation:

$$fn(x)=an \times g(x>thn)+bn$$

The parameters that are calculated using the learning process and the data (tag) indicating whether the identification performance is high or low are set for each of the filters (weak learners) to generate a recognition dictionary, and the recognition dictionary is stored in the recognition dictionary storage unit 114.

2B-3. Processes Executed by Recognition Process Unit

Next, description will be given of the process executed by the recognition process unit 120 illustrated in FIG. 4.

Description will be given of the specific object detection process which determines whether or not the finger is contained in the image. The process corresponds to the processes of steps S103 and S104 of the flow illustrated in FIG. 2.

The recognition process unit 120 includes the image input unit 121, the feature value extraction unit 122, and the specific object recognition unit 123.

The recognition process unit 120 receives input of analysis target images and performs the detection of the specific object. The recognition process unit 120 performs the detection of the specific object using the recognition dictionary that is generated by the learning process unit 110 based on the learning data and stored in the recognition dictionary storage unit 114.

The image input unit 121 of the recognition process unit 120 receives input of the image which is the analysis target. In other words, the image input unit 121 receives input of the captured image of the camera L 11 and the captured image of the camera R 12 of the capturing environment illustrated in FIG. 1A.

The analysis target image is, as opposed to the learning image, an image in which it is unclear whether or not the finger is contained in the captured image. Note that, as described earlier, the finger detection process that detects whether or not the finger is present may use only one of the L image or the R image.

The feature value extraction unit 122 executes the feature value extraction process in which the filters that are described with reference to FIGS. 5A, 5B, and 6 are applied in the same manner are the feature value extraction that is executed by the feature value extraction unit 112 of the learning process unit 110.

However, in regard to the filters (the weak learners) that are applied by the feature value extraction unit 122 of the recognition process unit 120, only the filters that are determined to have high identification performance by the learning results of the learning process unit 110 are selected and executed. The filters are selected based on the filter information (the tags) that is stored in the recognition dictionary storage unit 114.

The parameters an, bn, and thn of the equation of the calculation of the feature value (x) that is calculated using the filters (the weak learners), that is, of the following equation:

$$fn(x)=an \times g(x>thn)+bn$$

are determined using the learning process of the learning process unit 110 described above, and the values that are stored in the recognition dictionary storage unit 114 are used.

The recognition process unit 120 calculates the feature values using the filters with high identification performance that are selected, executes the calculation of the score, and performs the finger detection process based on the score.

The feature value extraction unit 122 first, as described above, removes the irradiation pattern contained in the camera captured image and generates a patternless image. This process corresponds to the process of step S103 of the flow illustrated in FIG. 2. The non-pattern-irradiated image is generated by executing pixel value correction in which pixel values corresponding to the known irradiation pattern are subtracted from the input image.

Figure 12:
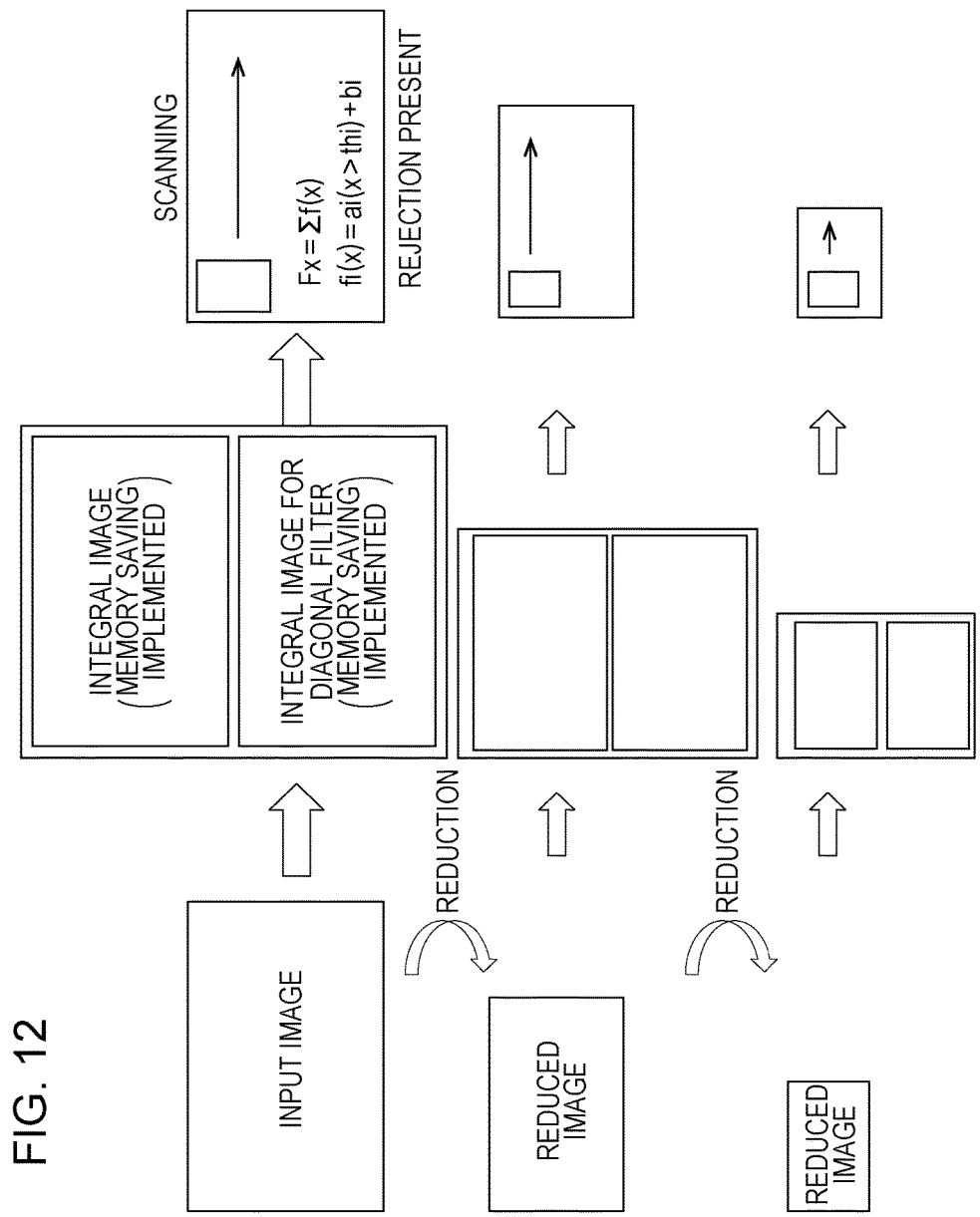
FIG. 12 is a diagram illustrating a feature value extraction process.

FIG. 12 is a diagram schematically illustrating the procedure of the image search process that is executed by the recognition process unit 120 in relation to the non-pattern-irradiated image.

First, an integral image is created from the generated non-pattern-irradiated image as an intermediate image.

The filter application process described with reference to FIGS. 7A to 7D may be executed directly in relation to the generated non-pattern-irradiated image; however, it is possible to realize a fast process by generating the integral image as an intermediate image and executing the filter application in relation to the integral image.

Note that, the process of generating the integral image and the process of increasing the speed of the feature value calculation are described in Japanese Unexamined Patent Application Publication No. 2011-180792, which is an application made previously by the present applicant. The process according to an embodiment of the present disclosure also executes the generation of the integral image and the feature value calculation in which the integral image is applied according to the same process procedure as described in Japanese Unexamined Patent Application Publication No. 2011-180792.

The method of creating the integral image differs depending on whether the integral image is for the vertical and horizontal direction rectangular filters or for the diagonal direction rectangular filters. The feature value extraction unit 122 of the recognition process unit 120 creates two types of integral image, one for the vertical and horizontal direction rectangular filters and one for the diagonal direction rectangular filters, the filters corresponding to the filters described with reference to FIGS. 5A, 5B, and 6.

The feature value extraction unit 122 of the recognition process unit 120 calculates the feature values by applying each of the filters on the integral image using the generated integral image. In other words, the feature value extraction unit 122 executes the calculation process of the feature value (x) described earlier with reference to FIGS. 7A to 7D. Specifically, the feature value extraction unit 122 scans the integral image, and calculates the feature value (x) in each scanning position (x, y) by applying the expressions 1 to 3 described earlier.

Here, the filters to be applied are the selected filters (weak learners) with high identification levels. The specific object recognition unit 123 calculates the score by adding together the feature values that are obtained by applying the plurality of selected filters (weak learners). This process is the one described earlier with reference to FIG. 8.

By using the integral image, it is possible to compute the rectangular features at high speed for each scanning position.

When the detection score reaches a value that is greater than or equal to the threshold that is set in advance, it is determined that the target object, the finger in the present example, is detected at the scanning position (x, y).

Depending on the maximum detected score that is obtained by scanning the image, there is a case in which the detection result returns a negative (a rejection) result, that is, a result is returned indicating that the target object (the finger) is not detected. A configuration may be adopted in which the generation of the integral image and the computation of the detection score are performed repeatedly while changing the scale, that is, while changing the magnitude of the integral image.

Note that, it is possible to search a window of an arbitrary size by converting the scale of the integral image that is first computed; however, when the scale of the integral image is converted, the operation amount increases, and this cancels out the effect of using the integral image to increase the speed of the process. Therefore, in the example illustrated in FIG. 12, the integral image is computed again each time the scale of the integral image is converted.

Figure 13:
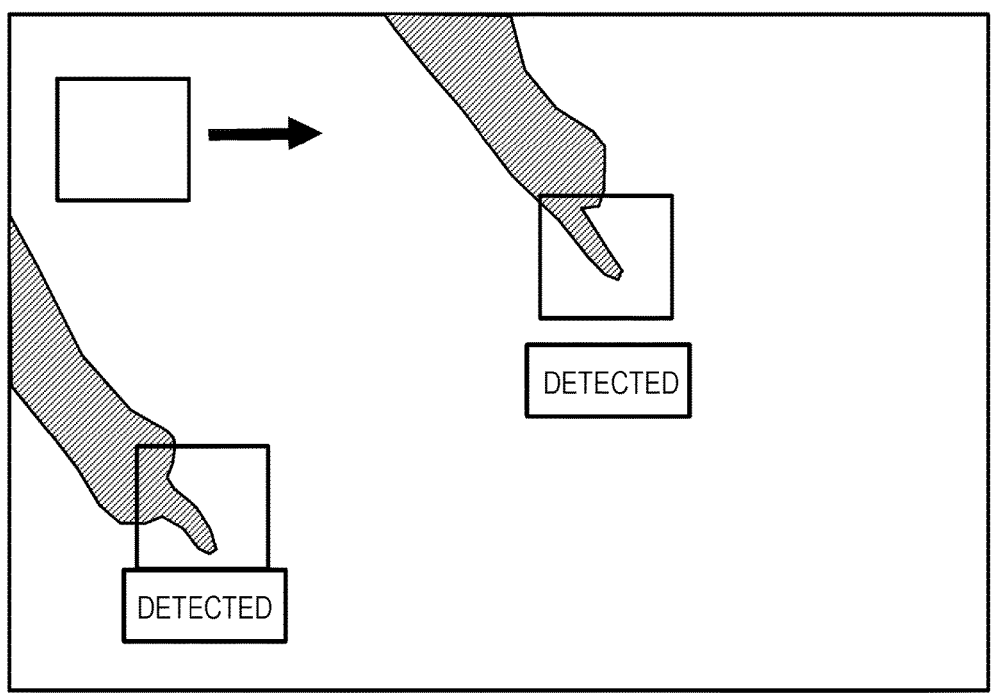
FIG. 13 is a diagram illustrating a feature value extraction process.

An example of the scanning process of the image is illustrated in FIG. 13.

A sequential scanning process is executed in the horizontal direction from the top left of the image, the feature values (x) based on the individual selected filters are calculated for each of the pixel points, and the score corresponding to each of the pixel points is subsequently calculated by adding together the feature values (x) that are calculated based on each of the selected filters.

When the calculated score exceeds the threshold that is set in advance, it is determined that the target object (the finger) is detected.

As illustrated in FIG. 13, the scores are calculated as scores that correspond to each of the pixel positions. However, for example, even if the score of only one pixel position is high, the target object (the finger) may not be said to be detected in the image. In other words, for example, even if a plurality of high scores that correspond to a plurality of pixel positions corresponding to the shape of a finger are not detected, the target object (the finger) may not be said to be detected in the image.

Therefore, in order to determine finally whether or not a finger is detected, it is necessary to evaluate a total of the scores of the plurality of pixel positions. The specific object recognition unit 123 executes a total evaluation process of the scores.

Figure 14:
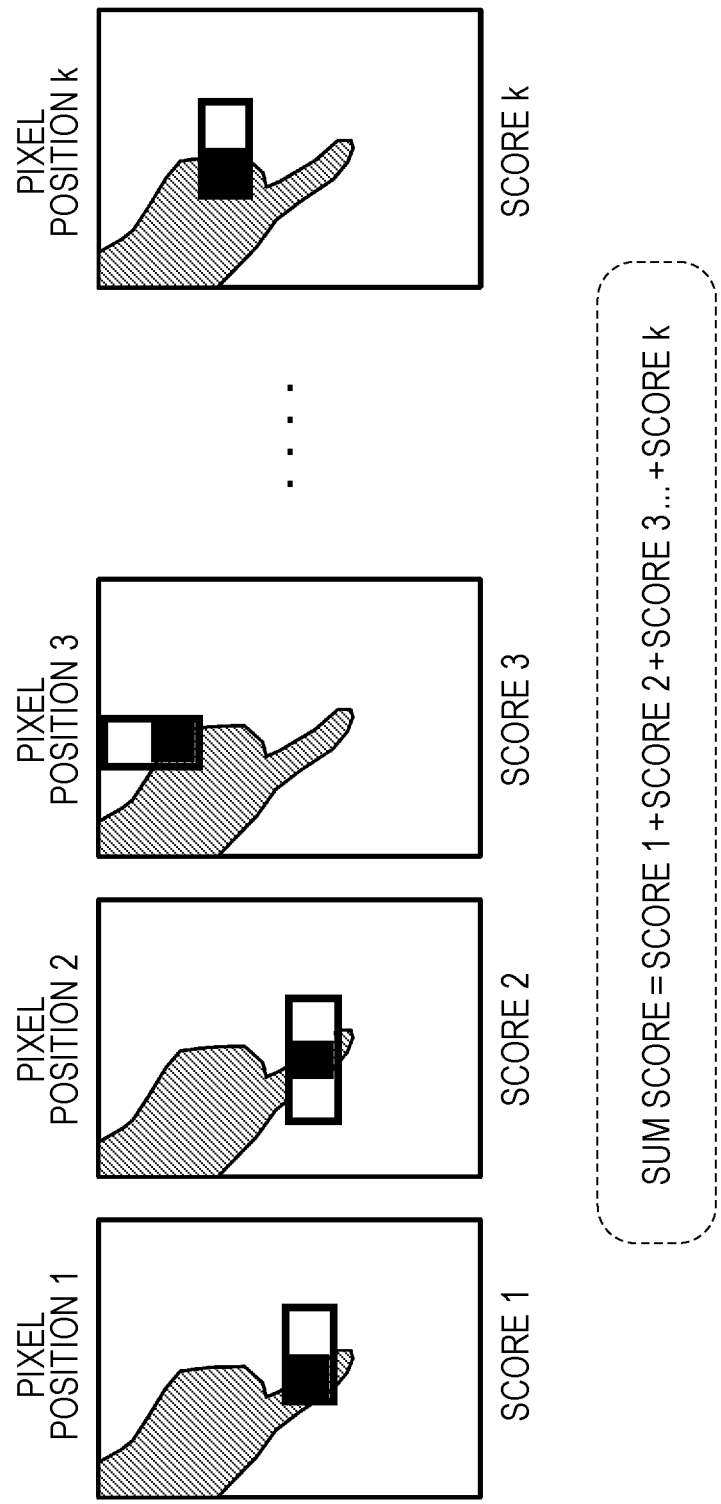
FIG. 14 is a diagram illustrating a total score calculation process.

Description will be given of an example of the total evaluation process of the scores with reference to FIG. 14. FIG. 14 illustrates images indicating the filter application process at each pixel position (the pixel positions 1 to k) that are set by the scanning process in relation to the image, and score 1 to score k that are calculated at each of the pixel positions.

When a finger is detected, the score at each of the pixel positions rises. The total score, which is the total evaluation value as final the index value that determines whether or not the target object (the finger) is contained in the image, is calculated as the sum value of the scores of the image positions.

In other words, a value that is obtained by adding together the scores corresponding to each of the pixels of the image in the manner shown in the following equation: total score=score 1+score 2+ . . . +score k is set to the total score, and when the total score is greater than or equal to the threshold that is set in advance, the target object (the finger) is determined to be detected.

As described with reference to the flow illustrated in FIG. 2, in the distance calculation process, the information processing device according to an embodiment of the present disclosure executes a process in which the two pattern-irradiated images that are captured from different viewpoints are applied.

Meanwhile, in the object detection process, the information processing device executes a process which uses the non-pattern-irradiated image that is generated by subtracting the pattern image component from the pattern-irradiated image. By performing these processes, it is possible to execute both the object distance calculation process and the object detection process as high precision processes.

3. Second Example of Information Processing Device of Present Disclosure

Next, description will be given of the second example of the information processing device of the present disclosure. Description will be given of the sequence of processes of the second example of the information processing device of the present disclosure with reference to the flowchart illustrated in FIG. 15.

In the second example, for example, the information processing device receives the captured images of the camera L 11 and the camera R 12, which are the cameras that are installed in two different positions illustrated in FIG. 1A, as input. (a) is a "specific object distance calculation process" which calculates the distance of a specific object in the captured images. (b) is a "specific object detection process" which determines whether or not a specific object is contained in the captured images. Based on the input images, the information processing device executes the processes (a) and (b).

Figure 15:
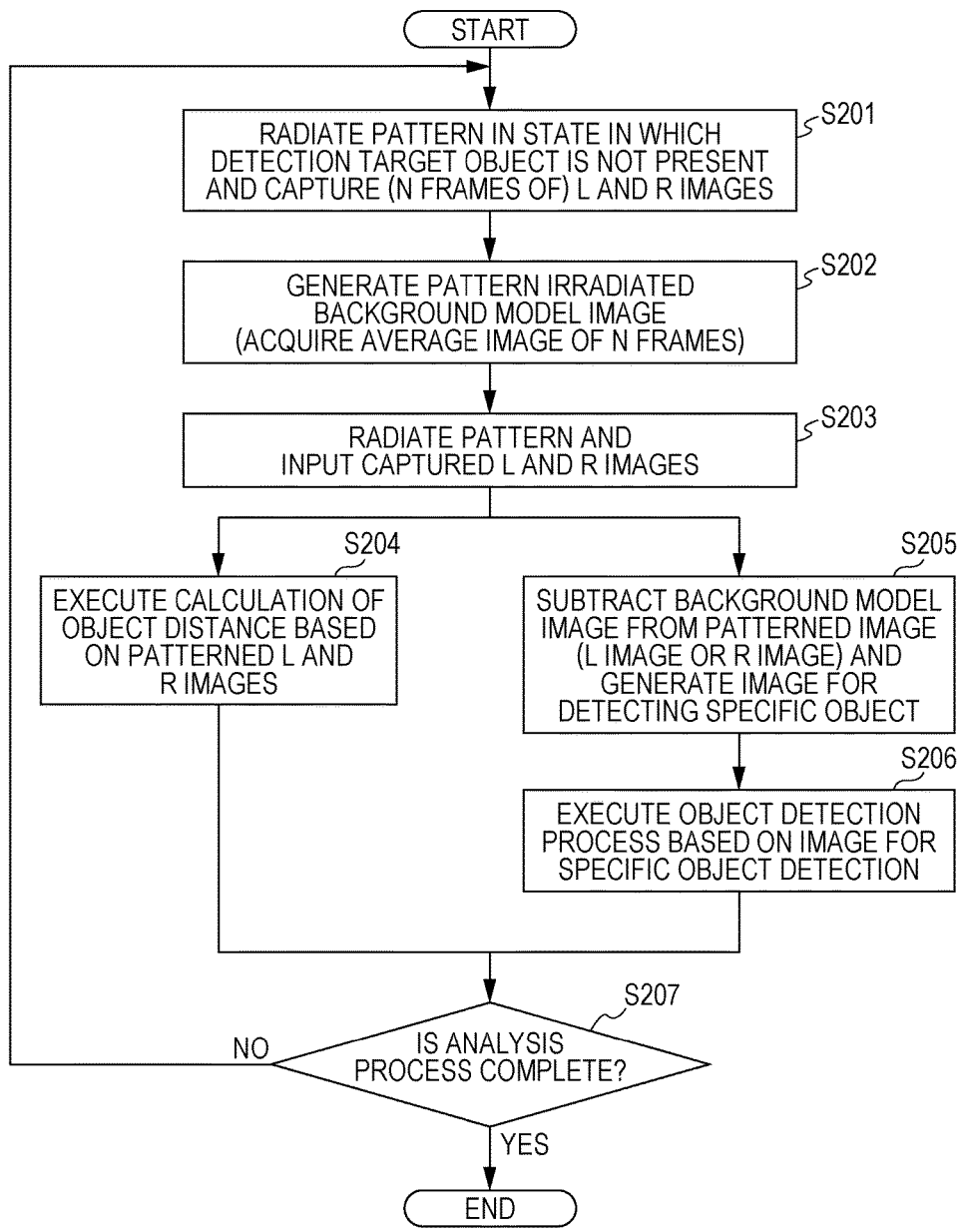
FIG. 15 is a diagram depicting a flowchart that illustrates an example of a sequence of processes which are executed by the information processing device according to an embodiment of the present disclosure.

Description will be given of the processes of each step in the flow illustrated in FIG. 15.

Step S201

First, the information processing device captures images in a state in which the detection target object is absent, in a pattern-irradiated state. For example, in FIG. 1A, when the detection target object is the finger 30, images are captured by the camera L 11 and the camera R 12 without including the finger 30 in the capturing region. Each camera captures N continuous frames.

Step S202

Next, the information processing device generates a background model image based on the pattern-irradiated images captured in step S201. Specifically, for example, the information processing device generates an average image of the N captured image frames. The average image is set to the background model image.

The processes of steps S201 and S202 are preparatory processes, and are executed in advance as processes that generate the background model image. The processes of step S203 onward that are described below are object detection processes which are executed after the generation of the background model image.

Step S203

In step S203, the information processing device performs capture of the analysis target images of the object detection process. It is unclear whether or not the detection target object (the finger) is contained in the images.

The information processing device causes the pattern radiating unit 13 to radiate a pattern, causes the cameras, the camera L 11 and the camera R 12, which are installed in two different positions to capture the pattern-irradiated image, and receives the input thereof.

Step S204

The process of step S204 can be executed in parallel with the processes of steps S205 and S206. The process of step S204 is a similar process to that of step S102 of the flow described earlier with reference to FIG. 2, and is the object distance calculation process that uses the pattern-irradiated L and R images which are captured in step S203. Here, the distance of the finger 30 from the cameras is calculated. In the distance calculation, it is necessary to detect corresponding points in the L image and the R image.

The patterns in the images are use effectively for executing the corresponding point detection at high precision. Note that, in the present example, the object distance calculation uses the stereo method that uses corresponding point matching. This specific process is the same as that described earlier with reference to FIG. 3.

Step S205

The processes of steps S205 and S206 perform the detection of the specific object from within the captured image. For example, it is determined whether or not the finger 30 is contained in the image.

Note that, the object detection process may be executed on only one of the L image or the R image, and may be executed on each of the two images. Here, description will be given of an example in which the object detection is performed on only one of the L and R images.

The process of step S205 generates an image for specific object detection by subtracting the background model image generated in step S202 from the patterned image that is input in step S203. The pixel values of the background model image that is generated in step S202 are subtracted in relation to each corresponding pixel from the pixel values of the patterned image that is input in step S203.

According to this process, the pixel value=0 in image regions that are the same as the background model, the pixel value is set only for image regions of the specific object (the finger), and an image (the image for specific object detection) in which valid pixel values are set only in the finger regions is generated.

Step S206

Next, in step S206, using the image for specific object detection that is generated in step S205, the detection process of the specific object is executed. In other words, in the present example, the detection process of the object (the finger) in which it is determined whether or not a finger is contained in the captured image is executed.

The finger detection process uses the learning data which indicate the feature values that are accumulated in advance, and in the first example described above, the finger detection process is a similar process to that described with reference to FIGS. 4 to 14.

Step S207

Next, the information processing device determines whether or not the analysis process is complete in step S207. When no analysis target image is input, the information processing device determines the process to be complete. For example, when analysis is continuously executed at a frame interval that is defined in advance while capturing a moving image, the processes according to the flow illustrated in FIG. 15 are executed repeatedly at the predetermined frame interval. In this case, the decision of step S207 returns No, the process returns to step S201, and the analysis process of step S201 onward is repeatedly executed on new input images.

Note that, even in the present example, a configuration may be adopted in which the pattern radiated by the pattern radiating unit 13 is an irradiation pattern using infrared light, and the two cameras, camera L 11 and camera R 12, are cameras which are capable of capturing the pattern of infrared light. In this case, the corresponding point matching process of the L image and the R image which is executed in the calculation of the object distance in step S204 is executed using an infrared light pattern.

In this manner, in the second example, in regard to the object distance calculation, the object distance calculation is executed based on two pattern-irradiated images that are captured from different viewpoints. Meanwhile, in the object detection process, a pattern-irradiated background model image that does not contain the detection target object is generated in advance, the image for specific object detection is generated by subtracting the background model image from the pattern-irradiated image, and the object detection process is executed using the image for specific object detection.

By performing these processes, it is possible to execute both the object distance calculation process and the object detection process as high precision processes.

4. Third Example of Information Processing Device of Present Disclosure

Next, description will be given of the third example of the information processing device of the present disclosure. Description will be given of the sequence of processes of the second example of the information processing device of the present disclosure with reference to the flowchart illustrated in FIG. 16.

In the third example, for example, the information processing device receives the captured images of the camera L 11 and the camera R 12, which are the cameras that are installed in two different positions illustrated in FIG. 1A, as input. (a) is a "specific object distance calculation process" which calculates the distance of a specific object in the captured images. (b) is a "specific object detection process" which determines whether or not a specific object is contained in the captured images. Based on the input images, the information processing device executes the processes (a) and (b).

Figure 16:
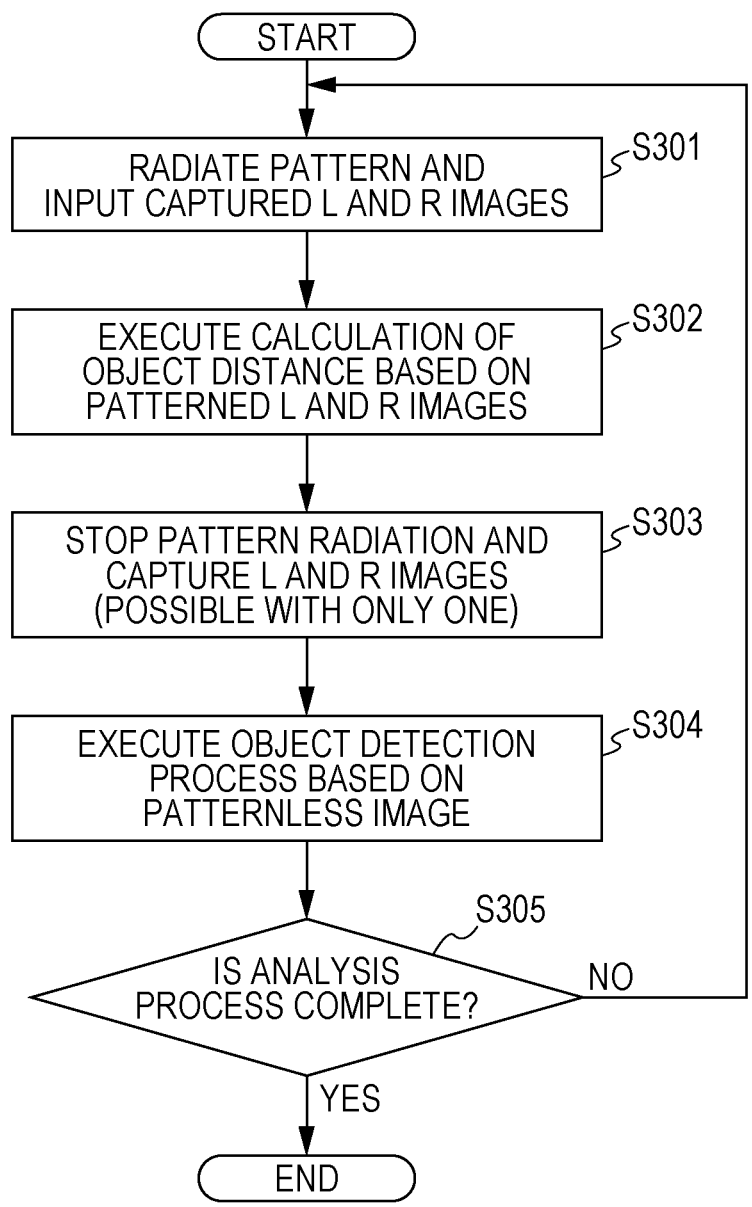
FIG. 16 is a diagram depicting a flowchart that illustrates an example of a sequence of processes which are executed by the information processing device according to an embodiment of the present disclosure.

Description will be given of the processes of each step in the flow illustrated in FIG. 16.

Step S301

First, the information processing device causes the pattern radiating unit 13 to radiate a pattern, causes the cameras, the camera L 11 and the camera R 12, which are installed in two different positions to capture the pattern-irradiated image, and receives the input thereof.

Step S302

The process of step S302 is the object distance calculation process that uses the pattern-irradiated L and R images which are captured in step S301.

Here, the distance of the finger 30 from the cameras is calculated. In the distance calculation, it is necessary to detect corresponding points in the L image and the R image.

The patterns in the images are use effectively for executing the corresponding point detection at high precision. Note that, in the present example, the object distance calculation uses the stereo method that uses corresponding point matching. A specific process example will be described later.

Step S303

The processes of steps S303 and S304 perform the detection of the specific object from within the captured image. For example, it is determined whether or not the finger 30 is contained in the image.

Note that, the object detection process may be executed on only one of the L image or the R image, and may be executed on each of the two images. Here, description will be given of an example in which the object detection is performed on only one of the L and R images.

In step S303, the information processing device causes the pattern radiating unit 13 to stop radiating a pattern, and receives the input of the non-pattern-irradiated image that is captured by one of the cameras of the camera L 11 and the camera R 12.

Step S304

Next, in step S304, using the patternless image that is generated in step S303, the detection process of the specific object in the captured image is executed. In other words, in the present example, the detection process of the object (the finger) in which it is determined whether or not a finger is contained in the captured image is executed.

In the finger detection process, learning data which indicate the feature values that are accumulated in advance are used. This specific process is the same as that described earlier with reference to FIGS. 4 to 14 in the first example.

Step S305

Next, the information processing device determines whether or not the analysis process is complete in step S305. When no analysis target image is input, the information processing device determines the process to be complete. For example, when analysis is continuously executed at a frame interval that is defined in advance while capturing a moving image, the processes according to the flow illustrated in FIG. 2 are executed continuously at the predetermined frame interval. In this case, the decision of step S305 returns No, the process returns to step S301, and the analysis process of step S301 onward is repeatedly executed on new input images.

Note that, even in the present example, a configuration may be adopted in which the pattern radiated by the pattern radiating unit 13 is an irradiation pattern using infrared light, and the two cameras, camera L 11 and camera R 12, are cameras which are capable of capturing the pattern of infrared light. In this case, the corresponding point matching process of the L image and the R image which is executed in the calculation of the object distance in step S302 is executed using an infrared light pattern.

In the same manner as in the first example, the information processing device of the third example executes the object distance calculation process based on the two pattern-irradiated images that are captured from different viewpoints, and further executes the object detection process using the non-pattern-irradiated image that is generated from the pattern-irradiated image.

The third example is different from the first example in that the object distance calculation process and the object detection process are executed alternately. Note that, in the example described here, the target object of the distance calculation and the detection process is the finger.

As described with reference to the flow illustrated in FIG. 16, in the distance calculation process, the information processing device according to an embodiment of the present disclosure executes a process in which the two pattern-irradiated images that are captured from different viewpoints are applied.

Meanwhile, in the object detection process, the information processing device executes a process which uses the non-pattern-irradiated image.

By performing these processes, it is possible to execute both the object distance calculation process and the object detection process as high precision processes.

5. Configuration Example of Information Processing Device

Next, description will be given of the configuration example of the information processing device.

The information processing device may be configured of a computer device such as a PC, for example.

Figure 17:
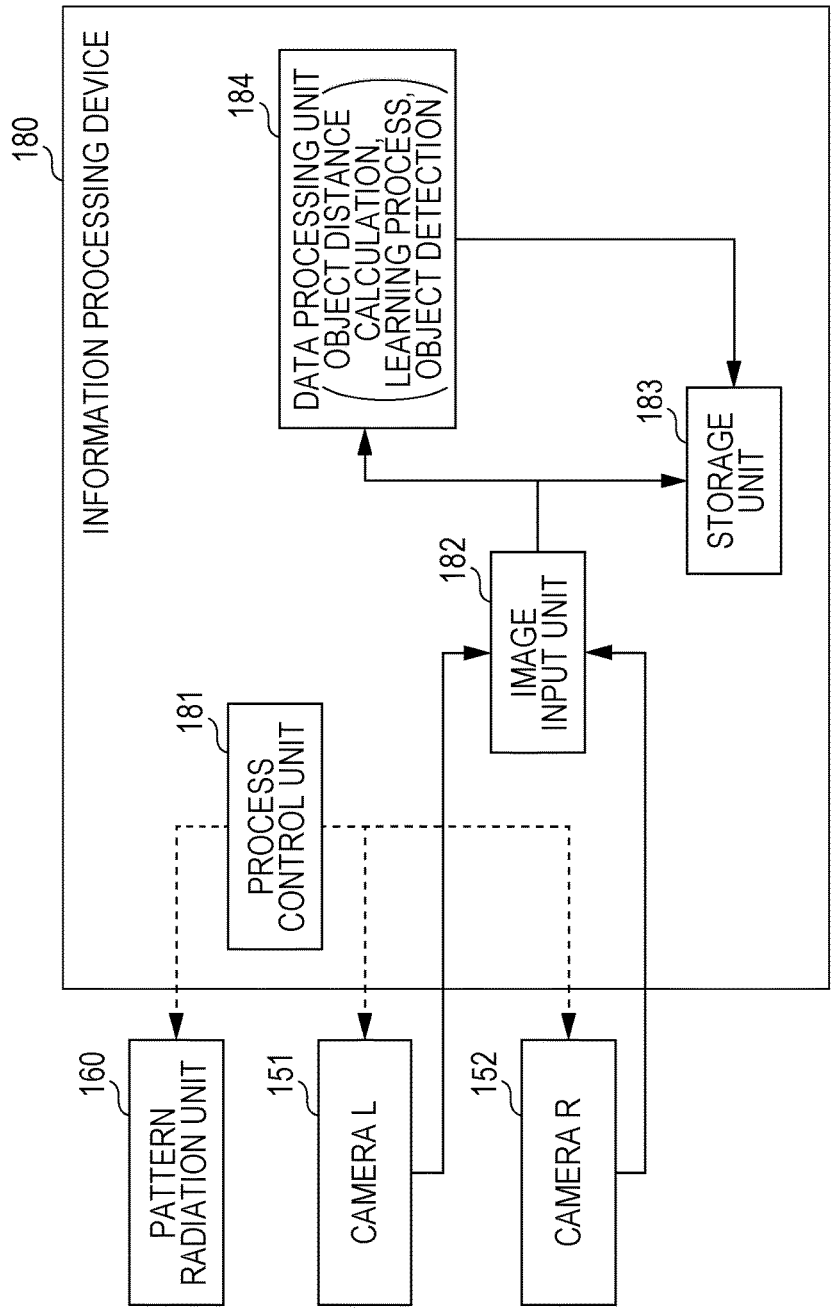
FIG. 17 is a diagram illustrating a configuration example of the information processing device.

FIG. 17 is a block diagram illustrating a functional configuration of the information processing device.

Figure 18:
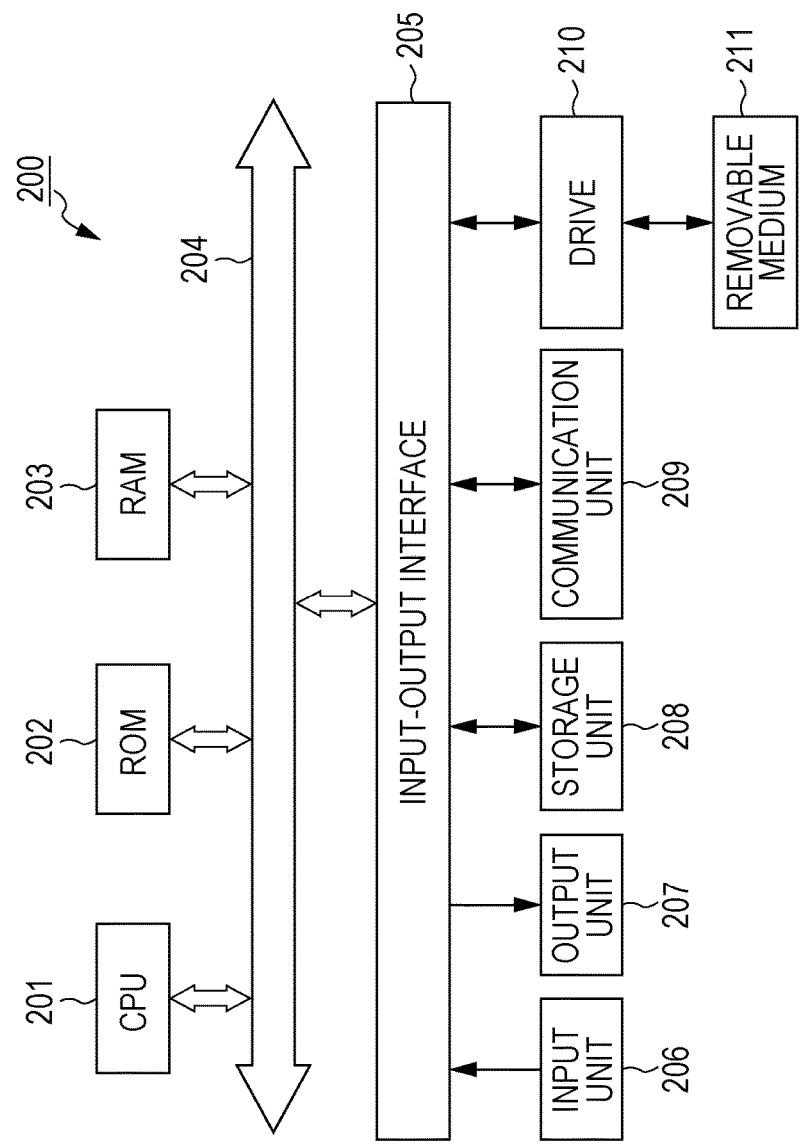
FIG. 18 is a diagram illustrating a configuration example of the information processing device.

FIG. 18 is a diagram illustrating an example of the hardware configuration of the information processing device.

First, description will be given of the functional configuration of the information processing device with reference to FIG. 17.

An information processing device 180 includes a process control unit 181 which controls the processes of a camera L 151 and a camera R 152 which capture images from different viewpoints, and the processes of a pattern radiating unit 160 which executes pattern radiation.

The information processing device 180 further includes an image input unit 182 which inputs the images captured by the camera L 151 and the camera R 152, a data processing unit 184 which executes processes according to those of the first to the third examples described above, and a storage unit 183 which is used as a storage region of the image data, the process programs, the various parameters, and the like.

The data processing unit 184 executes the distance calculation process of the object and the detection process of the object by analyzing the images. As described earlier in the examples, the data processing unit 184 also executes various image conversions such as the generation of patternless images from the patterned images.

Next, description will be given of an example of the hardware configuration of the information processing device which executes the processes described above, with reference to FIG. 18.

A central processing unit (CPU) 201 functions as a data processing unit that executes the various processes according to a program which is stored in read only memory (ROM) 202 or a storage unit 208. For example, the CPU 201 executes processes and the like according to the examples described earlier.

The program executed by the CPU 201, data, and the like are stored in random access memory (RAM) 203 as appropriate. The CPU 201, the ROM 202, and the RAM 203 are connected to each other by a bus 204. The CPU 201 is connected to an input-output interface 205 via the bus 204, and an input unit 206 which is formed of various switches, a keyboard, a mouse, a microphone, or the like, and an output unit 207 which is formed of a display, a speaker, or the like are connected to the input-output interface 205. The CPU 201 executes various processes according to commands that are input from the input unit 206, and outputs the process results to the output unit 207, for example.

The storage unit 208 which is connected to the input-output interface 205 is formed of a hard disk or the like, for example, and stores the programs that are executed by the CPU 201, and various data. A communication unit 209 communicates with external devices via a network such as the Internet, or a local area network.

A drive 210 which is connected to the input-output interface 205 drives a removable medium 211 which is the target of recording and reproduction of the data, and executes the recording and reproduction of the data. The program executed by the CPU 201, for example, can be provided as a packaged medium or the like by recording the program onto the removable medium 211.

6. Summary of Configuration of Present Disclosure

In the above, a detailed explanation is given of the examples of the present disclosure while giving reference to specific examples. However, it is obvious that a person skilled in the art can amend and modify the embodiment within the scope of the main concept of the present disclosure. In other words, the present technology is disclosed in the form of examples and should not be interpreted restrictively. In order to determine the main concept of the present disclosure, it is preferable to refer to Claims.

Furthermore, the technology disclosed in the present specification can adopt the following configurations:

(1) An information processing device includes a data processing unit that executes analysis of images which are captured from different viewpoints. The data processing unit executes an object distance calculation process in which pattern-irradiated images of a plurality of different viewpoints are applied, and an object detection process in which non-pattern-irradiated images are applied.

(2) In the information processing device according to (1), the data processing unit generates the non-pattern-irradiated image by performing an image conversion which subtracts a pattern image from the pattern-irradiated image, and executes an object detection process in which the generated non-pattern-irradiated image is applied.

(3) In the information processing device according to (1), the data processing unit includes (a) an object distance calculation process in which pattern-irradiated images of a plurality of different viewpoints are input and the pattern-irradiated images of a plurality of different viewpoints that are input are applied, and (b) an object detection process in which a non-pattern-irradiated image is input and the non-pattern-irradiated image that is input is applied. The data processing unit executes the (a) and the (b) processes alternately.

(4) In the information processing device according to any one of (1) to (3), in the object detection process, the data processing unit is configured to execute a feature value extraction process which extracts feature values from the non-pattern-irradiated image, and a specific object recognition process which executes a position determination process of a specific object based on the feature values. The feature value extraction process is executed as a feature value extraction process in which a plurality of filters are applied.

(5) In the information processing device according to (4), the data processing unit executes feature value extraction by selectively applying filters that are determined to have a high identification performance for distinguishing between a detected state and a non-detected state of the specific object in a learning process that is executed in advance.

(6) In the information processing device according to (4) or (5), the data processing unit calculates a score obtained by adding together feature values corresponding to different filters that are extracted in the feature value extraction process, and executes detection and determination processes of the specific object based on the sum score.

(7) In the information processing device according to any one of (4) to (6), the data processing unit calculates scores corresponding to pixels obtained by adding together feature values corresponding to pixels that correspond to different filters that are extracted in the feature value extraction process, and executes processes for detecting and determining the specific object based on a total score that is obtained by further adding together the calculated scores that correspond to the pixels.

(8) In the information processing device according to any one of (1) to (7), the pattern-irradiated image is an infrared light pattern-irradiated image.

(9) An information processing device, includes a data processing unit that executes analysis of images which are captured from different viewpoints. The data processing unit executes an object distance calculation process in which pattern-irradiated images of a plurality of different viewpoints are applied, and an object detection process in which an image for specific object detection that is generated by subtracting a background model image which does not contain a detection target from the pattern-irradiated image is applied.

(10) In the information processing device according to (9), the data processing unit continuously captures a plurality of frames of images that do not contain the detection target, and generates the background model image by averaging the plurality of captured images.

(11) In the information processing device according to (9) or (10), in the object detection process, the data processing unit is configured to execute a feature value extraction process which extracts feature values from the image for specific object detection, and a specific object recognition process which executes a position determination process of a specific object based on the feature values. The feature value extraction process is executed as a feature value extraction process in which a plurality of filters are applied.

(12) In the information processing device according to (11), the data processing unit executes feature value extraction by selectively applying filters that are determined to have a high identification performance for distinguishing between a detected state and a non-detected state of the specific object in a learning process that is executed in advance.

(13) In the information processing device according to (11) or (12), the data processing unit calculates a score obtained by adding together feature values corresponding to different filters that are extracted in the feature value extraction process, and executes detection and determination processes of the specific object based on the sum score.

(14) The information processing device according to any one of (11) to (13), the data processing unit calculates scores corresponding to pixels obtained by adding together feature values corresponding to pixels that correspond to different filters that are extracted in the feature value extraction process, and executes processes for detecting and determining the specific object based on a total score that is obtained by further adding together the calculated scores that correspond to the pixels.

(15) In the information processing device according to any one of (9) to (14), the pattern-irradiated image is an infrared light pattern-irradiated image.

(16) An information processing method executed by an information processing device, the method including causing a data processing unit to execute an object distance calculation process in which pattern-irradiated images of a plurality of different viewpoints are applied, and an object detection process in which non-pattern-irradiated images are applied.

(17) An information processing method executed by an information processing device, the method including causing a data processing unit to execute an object distance calculation process in which pattern-irradiated images of a plurality of different viewpoints are applied, and an object detection process in which an image for specific object detection that is generated by subtracting a background model image which does not contain a detection target from the pattern-irradiated image is applied.

(18) A program for causing an information processing device to execute information processing, the program including causing a data processing unit to execute an object distance calculation process in which pattern-irradiated images of a plurality of different viewpoints are applied, and an object detection process in which non-pattern-irradiated images are applied.

(19) A program for causing an information processing device to execute information processing, the program including causing a data processing unit to execute an object distance calculation process in which pattern-irradiated images of a plurality of different viewpoints are applied, and an object detection process in which an image for specific object detection that is generated by subtracting a background model image which does not contain a detection target from the pattern-irradiated image is applied.

The series of processes described in the specification may be executed by hardware, software, or combination of both. When executing the process using software, it is possible to either install a program, in which a process sequence is recorded, into the memory inside a computer, which is built into dedicated hardware, and execute the program, or, to install the program into a generic computer, which is able to execute various processes, and execute the program.

For example, the program can be recorded onto a recording medium in advance. Besides installing the program to a computer from a recording medium, the program may be received via a network such as a local area network (LAN) or the Internet, and installed to a recording medium such as an internal hard disk.

Note that, various processes described in the specification may be not only executed in time series according to the description, but also may be executed in parallel or individually according to the performance of the device executing the processes, or as necessary. The term "system" in the present specification refers to a logical group configuration of a plurality of devices, and the devices of the configurations are not limited to being within the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
a central processing unit (CPU) configured to:
analyze pattern-irradiated images captured by at least one camera from a plurality of different viewpoints, wherein each of the pattern-irradiated images includes a specific object and a pattern image;
calculate an object distance between the specific object and the at least one camera, based on the pattern-irradiated images of the plurality of different viewpoints;
generate non-pattern-irradiated images that include the specific object without the pattern image;
extract feature values of the specific object from the non-pattern-irradiated images based on a plurality of filters;
determine a position of the specific object based on the extracted feature values;
calculate a sum score by addition of the extracted feature values corresponding to the plurality of filters; and
detect the specific object based on the calculated sum score and the determined position.

2. The information processing device according to claim 1, wherein the CPU is further configured to:
execute an image conversion process, wherein the image conversion process comprises subtraction of the pattern image from a corresponding pattern-irradiated image of the pattern-irradiated images;
generate a non-pattern-irradiated image of the non-pattern-irradiated images based on the image conversion process; and
detect the specific object based on the generated non-pattern-irradiated image.

3. The information processing device according to claim 1, wherein the CPU is further configured to:
determine specific filters, that have a higher identification performance among the plurality of filters, to distinguish between a detected state of the specific object and a non-detected state of the specific object; and
extract the feature values based on the specific filters of the plurality of filters.

4. The information processing device according to claim 1, wherein the CPU is further configured to:
calculate scores corresponding to pixels by addition of the extracted feature values corresponding to the pixels, wherein the pixels correspond to the plurality of filters;
calculate a total score by addition of the calculated scores; and
detect the specific object based on the calculated total score.

5. The information processing device according to claim 1, wherein each of the pattern-irradiated images is an infrared light pattern-irradiated image.

6. An information processing device, comprising:
a central processing unit (CPU) configured to:
analyze pattern-irradiated images captured by at least one camera from a plurality of different viewpoints, wherein each of the pattern-irradiated images includes a specific object and a pattern image;
calculate an object distance between the specific object and the at least one camera, based on the pattern-irradiated images of the plurality of different viewpoints;
generate non-pattern-irradiated images by subtraction of a background model image from a corresponding pattern-irradiated image of the pattern-irradiated images, wherein the non-pattern-irradiated images include the specific object, and wherein the background model image is independent of a detection target;
extract feature values of the specific object from the non-pattern-irradiated images based on a plurality of filters;
determine a position of the specific object based on the extracted feature values;

calculate a sum score by addition of the extracted feature values corresponding to the plurality of filters; and detect the specific object based on the calculated sum score and the determined position.

7. The information processing device according to claim 6, further comprising a plurality of cameras configured to continuously capture a plurality of images that are independent of the detection target, wherein the CPU is further configured to generate the background model image based on an average of the plurality of images.

8. The information processing device according to claim 6, wherein the CPU is further configured to:

determine specific filters, that have a higher identification performance among the plurality of filters, to distinguish between a detected state of the specific object and a non-detected state of the specific object; and extract the feature values based on the specific filters of the plurality of filters.

9. The information processing device according to claim 6, wherein the CPU is further configured to:

calculate scores corresponding to pixels by addition of the extracted feature values corresponding to the pixels, wherein the pixels correspond to the plurality of filters;

calculate a total score by addition of the calculated scores; and detect the specific object based on the calculated total score.

10. The information processing device according to claim 6, wherein the each of the pattern-irradiated images is an infrared light pattern-irradiated image.

11. An information processing method, comprising:

in an information processing device:

analyzing pattern-irradiated images captured by at least one camera from a plurality of different viewpoints, wherein each of the pattern-irradiated images includes a specific object and a pattern image;

calculating an object distance between the specific object and the at least one camera, based on the pattern-irradiated images of the plurality of different viewpoints;

generating non-pattern-irradiated images that include the specific object without the pattern image;

extracting feature values of the specific object from the non-pattern-irradiated images based on a plurality of filters;

determining a position of the specific object based on the extracted feature values;

calculating a sum score by addition of the extracted feature values corresponding to the plurality of filters; and detecting the specific object based on the calculated sum score and the determined position.

12. An information processing method, comprising:

in an information processing device:

analyzing pattern-irradiated images captured by at least one camera from a plurality of different viewpoints, wherein each of the pattern-irradiated images includes a specific object and a pattern image;

calculating an object distance between the specific object and the at least one camera, based on the pattern-irradiated images of the plurality of different viewpoints;

generating non-pattern-irradiated images by subtraction of a background model image from a corresponding pattern-irradiated image of the pattern-irradiated images, wherein the non-pattern-irradiated images include the specific object, and wherein the background model image is independent of a detection target;

extracting feature values of the specific object from the non-pattern-irradiated images based on a plurality of filters;

determining a position of the specific object based on the extracted feature values;

calculating a sum score by addition of the extracted feature values corresponding to the plurality of filters; and detecting the specific object based on the calculated sum score and the determined position.

13. A non-transitory computer-readable medium having stored thereon computer-executable instructions that, when executed by a processor of an information processing device, cause the processor to execute operations, the operations comprising:

analyzing pattern-irradiated images captured by at least one camera from a plurality of different viewpoints, wherein each of the pattern-irradiated images includes a specific object and a pattern image;

calculating an object distance between the specific object and the at least one camera, based on the pattern-irradiated images of the plurality of different viewpoints;

generating non-pattern-irradiated images that include the specific object without the pattern image;

extracting feature values of the specific object from the non-pattern-irradiated images based on a plurality of filters;

determining a position of the specific object based on the extracted feature values;

calculating a sum score by addition of the extracted feature values corresponding to the plurality of filters; and detecting the specific object based on the calculated sum score and the determined position.

14. A non-transitory computer-readable medium having stored thereon computer-executable instructions that, when executed by a processor of an information processing device, cause the processor to execute operations, the operations comprising:

analyzing pattern-irradiated images captured by at least one camera from a plurality of different viewpoints, wherein each of the pattern-irradiated images includes a specific object and a pattern image;

calculating an object distance between the specific object and the at least one camera, based on the pattern-irradiated images of the plurality of different viewpoints;

generating non-pattern-irradiated images by subtraction of a background model image from a corresponding pattern-irradiated image of the pattern-irradiated images, wherein the non-pattern-irradiated images include the specific object, and wherein the background model image is independent of a detection target;

extracting feature values of the specific object from the non-pattern-irradiated images based on a plurality of filters;

determining a position of the specific object based on the extracted feature values;

calculating a sum score by addition of the extracted feature values corresponding to the plurality of filters; and detecting the specific object based on the calculated sum score and the determined position.

15. An information processing device, comprising:

a central processing unit (CPU) configured to:

analyze pattern-irradiated images captured by at least one camera from a plurality of different viewpoints, wherein each of the pattern-irradiated images includes a specific object and a pattern image;

calculate an object distance between the specific object and the at least one camera, based on the pattern-irradiated images of the plurality of different viewpoints;

generate non-pattern-irradiated images that include the specific object without the pattern image;

extract feature values of the specific object from the non-pattern-irradiated images based on a plurality of filters;

determine a position of the specific object based on the extracted feature values;

calculate scores corresponding to pixels by addition of the extracted feature values corresponding to the pixels, wherein the pixels correspond to the plurality of filters;

calculate a total score by addition of the calculated scores; and detect the specific object based on the calculated total score and the determined position.

* * * * *